(12) United States Patent
Karst et al.

(10) Patent No.: US 11,116,133 B2
(45) Date of Patent: Sep. 14, 2021

(54) HEADER POSITIONING ASSEMBLY FOR AN AGRICULTURAL WORK VEHICLE AND CONTROL SYSTEM FOR THE SAME

(71) Applicant: Deere & Company, Moline, IL (US)

(72) Inventors: Austin J. Karst, Ottumwa, IA (US); Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 355 days.

(21) Appl. No.: 16/239,984

(22) Filed: Jan. 4, 2019

(65) Prior Publication Data
US 2020/0214200 A1   Jul. 9, 2020

(51) Int. Cl.
| | | |
|---|---|---|
| *A01D 41/16* | (2006.01) | |
| *A01D 41/06* | (2006.01) | |
| *A01D 41/127* | (2006.01) | |
| *A01D 34/54* | (2006.01) | |
| *A01D 34/00* | (2006.01) | |

(Continued)

(52) U.S. Cl.
CPC ........... *A01D 41/16* (2013.01); *A01D 34/006* (2013.01); *A01D 34/43* (2013.01); *A01D 34/54* (2013.01); *A01D 41/06* (2013.01); *A01D 41/127* (2013.01); *A01D 45/00* (2013.01); *A01D 47/00* (2013.01)

(58) Field of Classification Search
CPC .... A01D 34/00; A01D 34/001; A01D 34/006; A01D 34/008; A01D 34/24–246; A01D 34/43; A01D 34/54; A01D 34/866; A01D 45/00; A01D 47/00; A01D 41/127; A01D 41/06; A01D 41/16; A01D 41/145;
(Continued)

(56) References Cited

U.S. PATENT DOCUMENTS

| | | | | |
|---|---|---|---|---|
| 5,203,738 A | * | 4/1993 | Busse ..................... | A01D 41/16 460/119 |
| 6,073,431 A | * | 6/2000 | Osborne ................ | A01D 41/16 56/15.7 |

(Continued)

FOREIGN PATENT DOCUMENTS

EP   2733680 A1   5/2014

OTHER PUBLICATIONS

John Deere, Windrowers—W100-W200 Series Brochure, May 2018.

*Primary Examiner* — Adam J Behrens
(74) *Attorney, Agent, or Firm* — Klintworth & Rozenblat IP LLP

(57) ABSTRACT

A control system for an agricultural work vehicle is provided, the control system includes at least one controller, at least one control input device configured to send control signals to the at least one controller, and a header positioning assembly configured to interchangeably couple a plurality of headers to a chassis of a traction unit. The header positioning assembly is moveable between a plurality of orientations with each of the plurality of orientations providing a unique mechanical advantage. The at least one controller is configured to output a plurality of control commands corresponding to the control signals generated by the at least one control input device, and the control commands are configured to effect movement of the header positioning assembly between the plurality of orientations. An agricultural work vehicle is provided and includes the control system.

15 Claims, 14 Drawing Sheets

(51) Int. Cl.
  *A01D 47/00* (2006.01)
  *A01D 45/00* (2018.01)
  *A01D 34/43* (2006.01)
(58) Field of Classification Search
  CPC .............. A01D 41/141; A01D 41/1274; A01D 41/142; A01D 67/00; A01D 67/005; A01D 75/04
  See application file for complete search history.

(56) References Cited

U.S. PATENT DOCUMENTS

| | | | |
|---|---|---|---|
| 6,397,571 B1* | 6/2002 | Ehrecke | A01D 41/127 460/1 |
| 6,519,923 B1* | 2/2003 | Cooksey | A01B 71/08 56/14.9 |
| 9,730,375 B2* | 8/2017 | De Coninck | A01B 63/008 |
| 10,182,525 B2* | 1/2019 | Isaac | A01D 57/02 |
| 10,398,083 B2* | 9/2019 | Rotole | A01D 41/16 |
| 10,701,863 B2* | 7/2020 | Foster | A01D 75/185 |
| 2017/0049045 A1* | 2/2017 | Wilken | A01D 41/06 |
| 2017/0110908 A1* | 4/2017 | Moyer | H02J 50/10 |
| 2018/0332768 A1* | 11/2018 | Isaac | A01D 75/287 |
| 2019/0261554 A1* | 8/2019 | Foster | A01D 34/008 |
| 2019/0335662 A1* | 11/2019 | Good | A01D 41/141 |

* cited by examiner

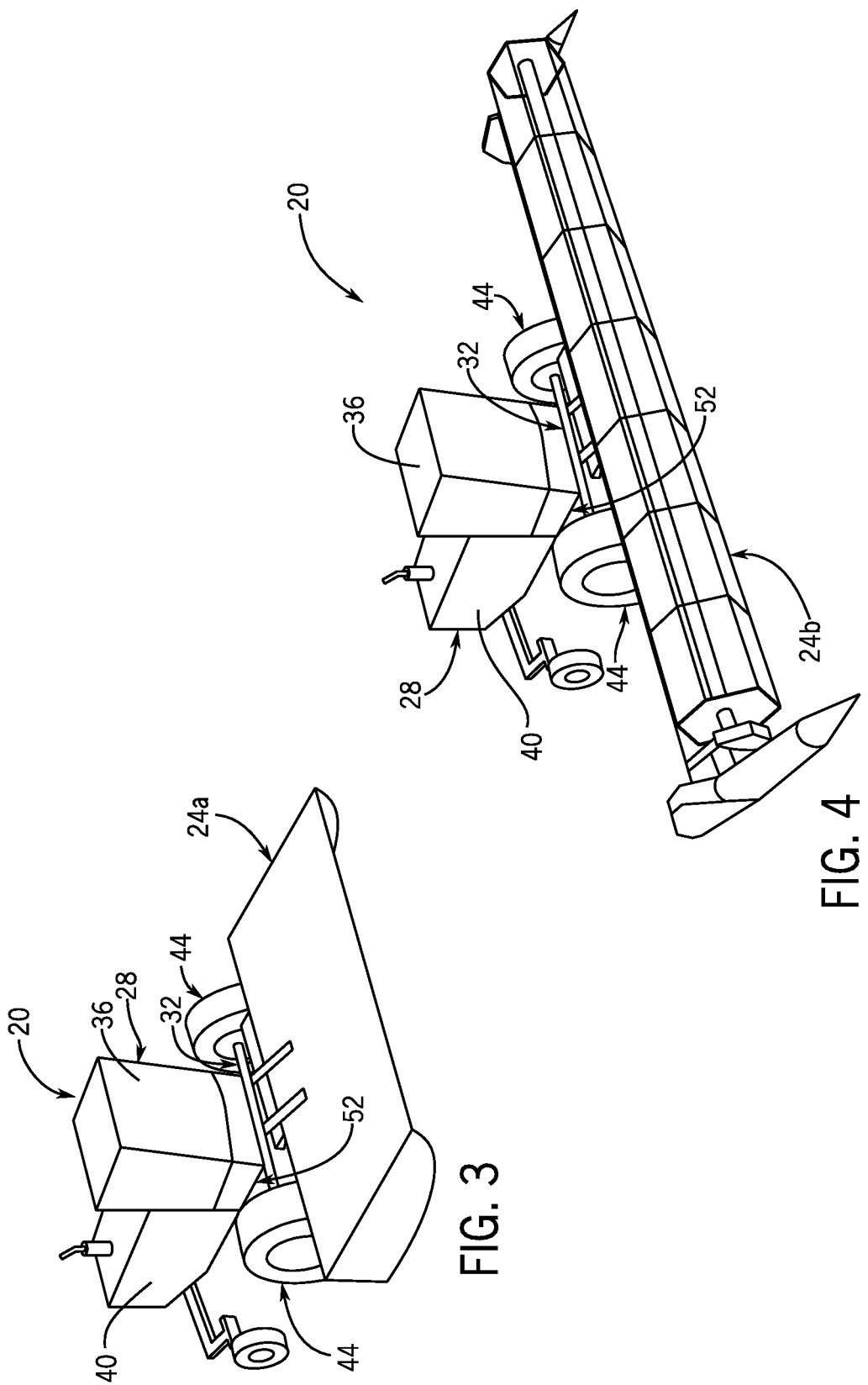

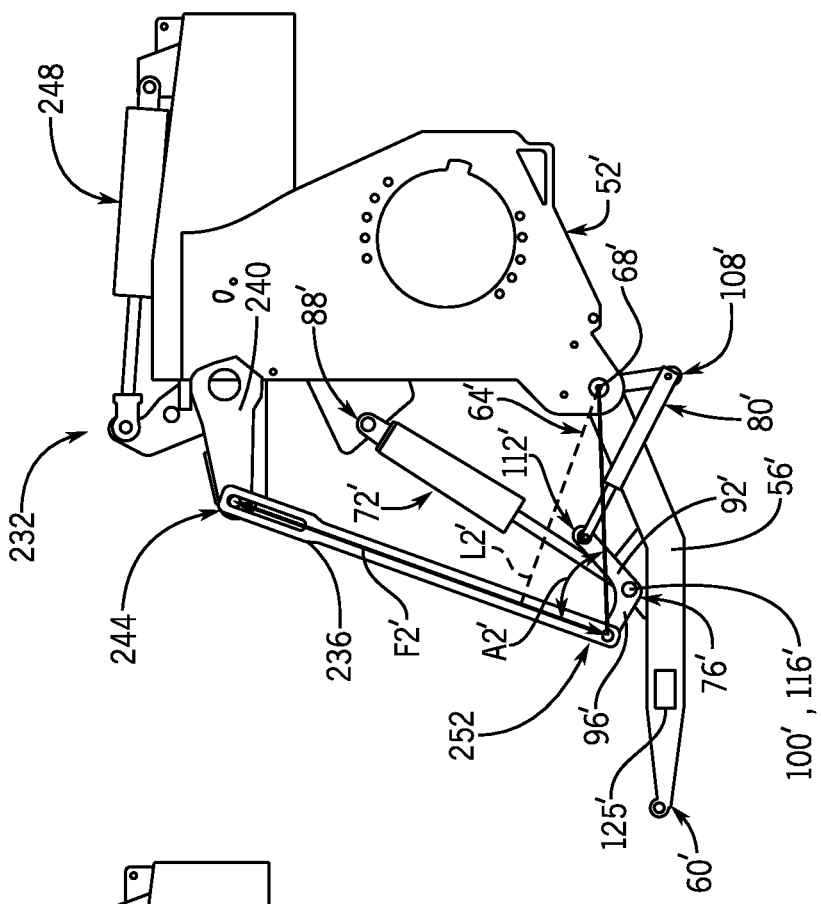
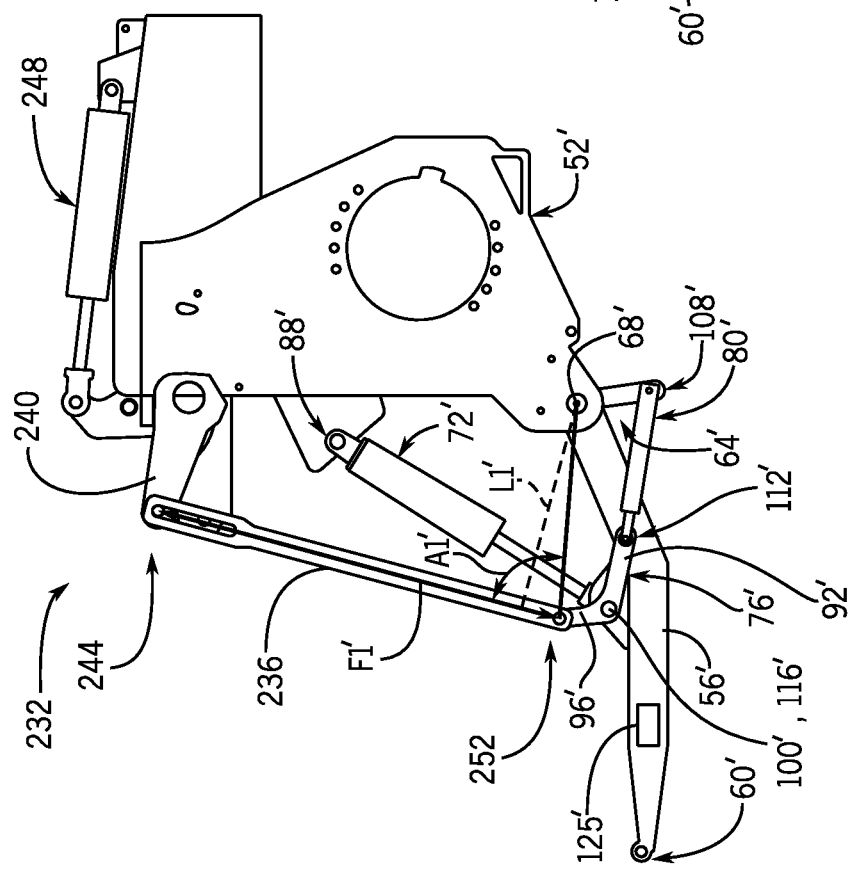
FIG. 11B
FIG. 11A

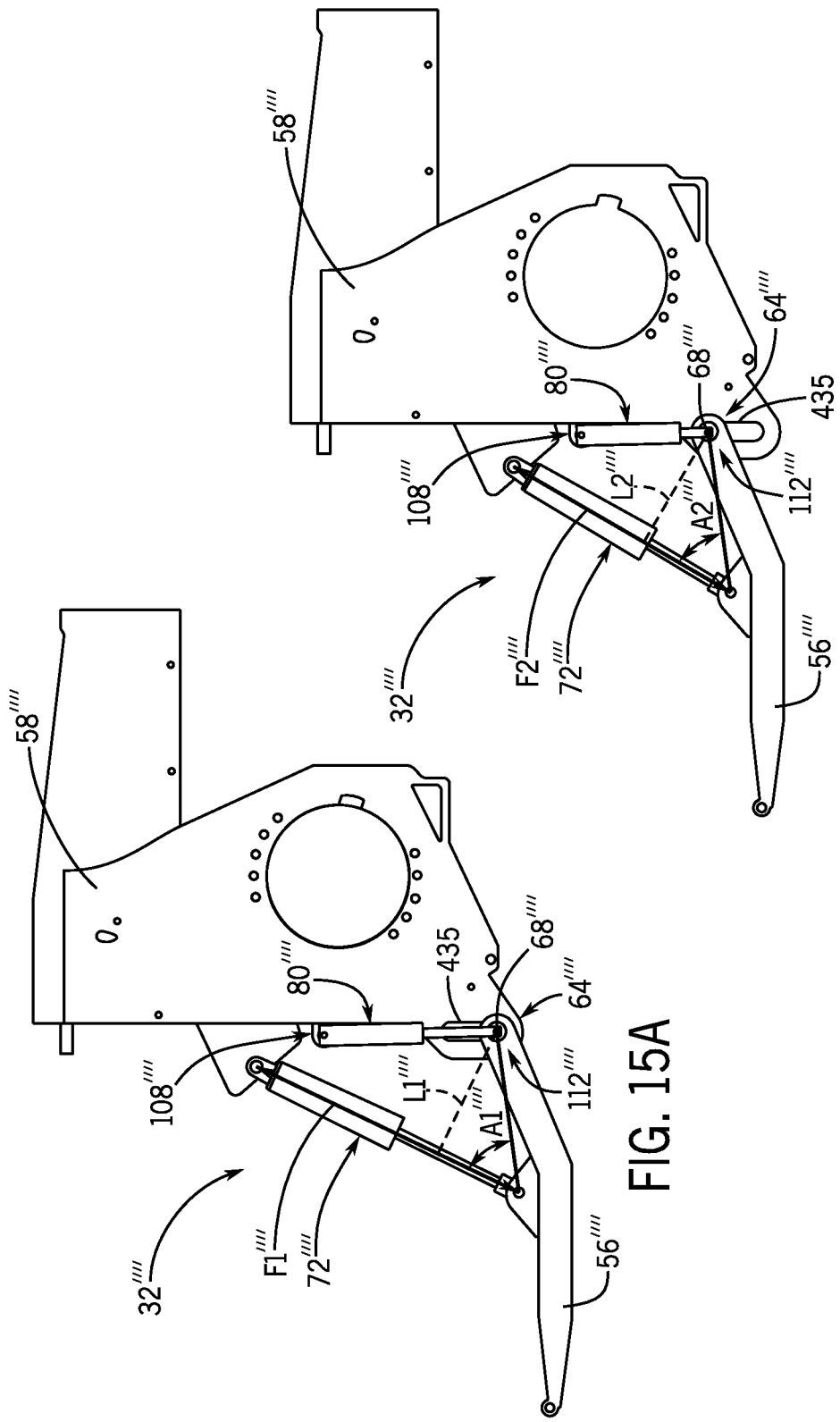

HEADER POSITIONING ASSEMBLY FOR AN AGRICULTURAL WORK VEHICLE AND CONTROL SYSTEM FOR THE SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to agricultural work vehicles, and more specifically to header positioning assemblies and methods of operating header positioning assemblies.

BACKGROUND OF THE DISCLOSURE

Various agriculture work vehicles perform a wide variety of agricultural operations such as, for example, combines and windrowers harvesting a variety of different crops. Depending on the crop or other factors, headers used to harvest the crop may have significantly different geometries, weights, and forward travel speed requirements. Examples of header platforms may include a rotary mower conditioner and a draper. A unique linkage system is typically required to connect each of the headers to a chassis of the agricultural work vehicle.

SUMMARY OF THE DISCLOSURE

The present disclosure provides a header positioning assembly for adjusting a header relative to a chassis of an agricultural.

In one aspect, this disclosure provides a header positioning assembly for adjusting a header relative to a chassis. The header positioning assemblies ensure each header has appropriate lift and floatation response and lateral tilt capabilities to consistently follow the contour of the ground. The header positioning assembly includes a lift mechanism configured to couple the header to the chassis, at least one lift actuator configured to apply a force to the lift mechanism to adjust and maintain an orientation of the lift mechanism relative to the chassis, and an adjustment mechanism coupled to the at least one lift actuator or to the lift mechanism. The adjustment mechanism is positionable in at least two orientations and configured so that when the adjustment mechanism is in the at least two orientations, and without uncoupling the adjustment mechanism from the at least one lift actuator or the lift mechanism to which the adjustment mechanism is coupled, the adjustment mechanism changes one or more of a location and a direction of the force applied to the lift mechanism by the at least one lift actuator.

In another aspect, the disclosure provides an agricultural work vehicle having a header, a traction unit having a chassis, and a header positioning assembly for adjusting the header relative to the chassis. The header positioning assembly includes a lift mechanism configured to couple the header to the chassis, at least one lift actuator configured to apply a force to the lift mechanism to adjust and maintain an orientation of the lift mechanism relative to the chassis, and an adjustment mechanism coupled to the at least one lift actuator or to the lift mechanism. The adjustment mechanism is positionable in at least two orientations and configured so that when the adjustment mechanism is in the at least two orientations, and without uncoupling the adjustment mechanism from the at least one lift actuator or the lift mechanism to which the adjustment mechanism is coupled, the adjustment mechanism changes one or more of a location and a direction of the force applied to the lift mechanism by the at least one lift actuator.

In a further aspect, the disclosure provides a control system for an agricultural work vehicle. The control system includes at least one controller, at least one control input device configured to send control signals to the at least one controller, and a header positioning assembly configured to interchangeably couple a plurality of headers to a chassis of a traction unit. The header positioning assembly is moveable between a plurality of orientations with each of the plurality of orientations providing a unique mechanical advantage. The at least one controller is configured to output a plurality of control commands corresponding to the control signals generated by the at least one control input device, and the control commands are configured to effect movement of the header positioning assembly between the plurality of orientations.

In yet another aspect, the disclosure provides an agricultural work vehicle including a plurality of headers, a traction unit having a chassis, and a header positioning assembly configured to interchangeably couple the plurality of headers to the chassis. The header positioning assembly is moveable between a plurality of orientations with each of the plurality of orientations providing a unique mechanical advantage. The agricultural work vehicle also includes a control system including at least one controller, and at least one control input device configured to send control signals to the at least one controller. The at least one controller is configured to output a plurality of control commands corresponding to the control signals generated by the at least one control input device, and the control commands are configured to effect movement of the header positioning assembly between the plurality of orientations.

The details of one or more embodiments are set forth in the accompanying drawings and the description below. The components in the figures are not necessarily to scale, emphasis instead being placed upon illustrating the principles of the disclosure. Other features and advantages will become apparent from the description, the drawings, and the claims.

BRIEF DESCRIPTION OF THE DRAWINGS

FIG. 3 is a top, front perspective view of one example of the agricultural work vehicle with one example of a header and one example of a header positioning assembly;

FIG. 4 is a top, front perspective view of the agricultural work vehicle and the header positioning assembly with another example of a header;

FIG. 11A is a side elevational view of one example of the header positioning assembly in FIG. 10 in a first orientation;

FIG. 11B is a side elevational view of the header positioning assembly in FIG. 10 in a second orientation;

FIG. 15A is a side elevational view of one example of a portion of an agricultural work vehicle including one example of a header positioning assembly in a first orientation; and FIG. 15B is a side elevational view of the portion of the agricultural work vehicle and the header positioning assembly in FIG. 15A in a second orientation.

Like reference symbols in the various drawings indicate like elements.

DETAILED DESCRIPTION

Figure 1:
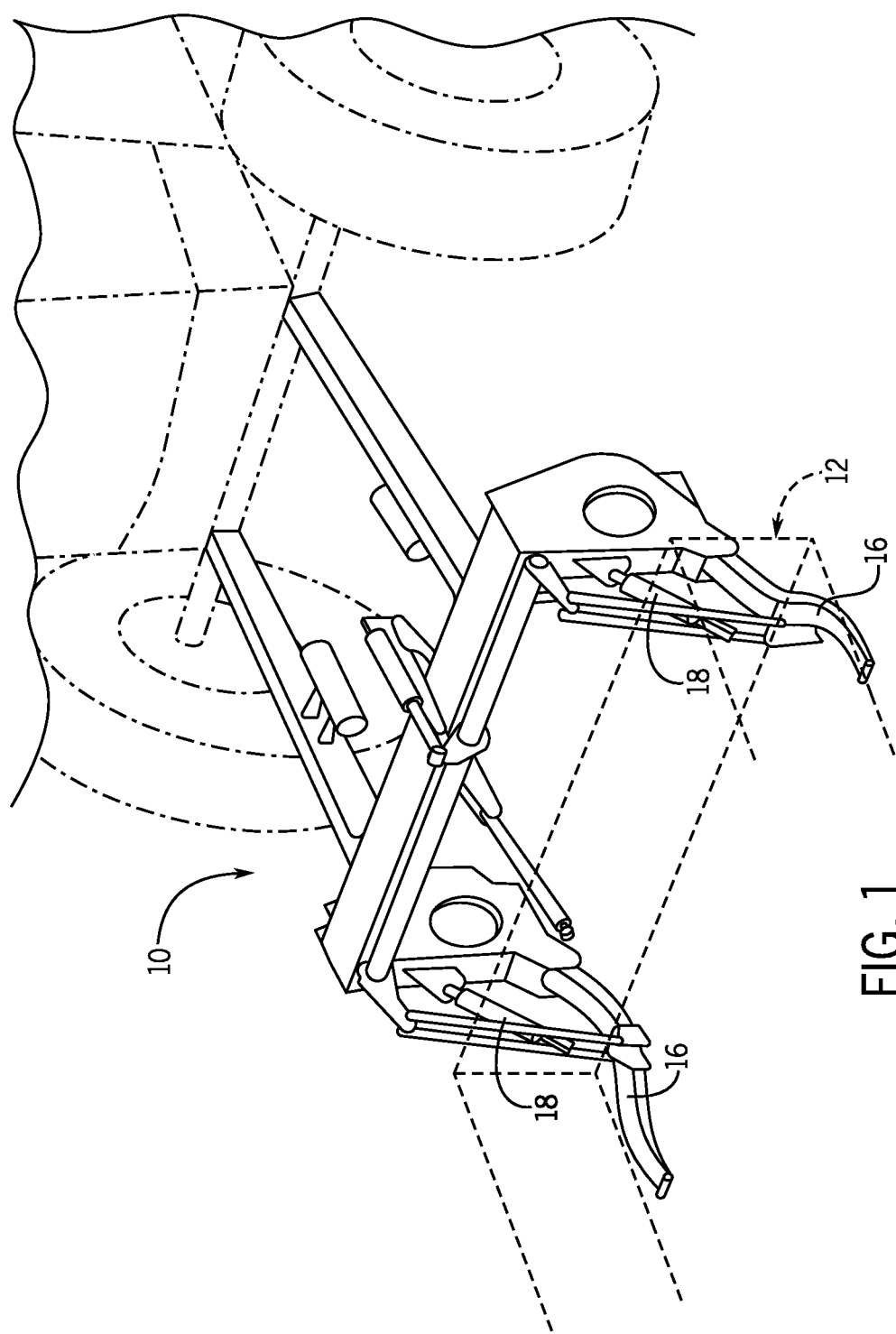
FIG. 1 is a top, front perspective view of a prior art header positioning assembly.

The following describes one or more example embodiments of the disclosed agricultural work vehicles, header positioning assemblies, and control systems for the agricultural work vehicles and header positioning assemblies as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the agricultural work vehicle travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes.

Agricultural work vehicles may be used to harvest agricultural crops, which may have unique dimensions, textures, and handling requirements. Accordingly, agricultural work vehicles may include a wide variety of crop interface components or headers to ensure proper handling and harvesting of the various agricultural crops. As indicated above, headers have significantly different geometries, weights, and forward travel speed requirements. One example of an agriculture work vehicle used to harvest or otherwise cut agricultural crops may be referred to as a windrower, and examples of header platforms used by windrowers to harvest agricultural crops may include, for example, a rotary mower conditioner and a draper.

Conventional windrowers or other agricultural work vehicles typically include two linkage systems, one on each side of the header. Each linkage system may include a float cylinder with one end of the float cylinder mechanically connected to the chassis of the agricultural work vehicle and manually moveable relative to the chassis to change the leverage of the float cylinder. To move the end of each float cylinder, a person manually removes a pin from the end of the float cylinder and adjusts a length of the float cylinder to reposition the end of the float cylinder at a new connection location on the chassis. The manual adjustment of the float cylinder may not be a simple task since the float cylinder and associated linkage are heavy and provide resistance to extension or compression of the cylinder due to the hydraulics associated with the float cylinder. In some cases, multiple people may be required to perform this adjustment. Once the float cylinder is adjusted to the appropriate length and repositioned at the new connection location, a person manually inserts the pin to reconnect the float cylinder to the chassis.

Conventional header positioning assemblies may be manually moved between a plurality of orientations with each orientation configured to accommodate a particular type of header. Such conventional header positioning assemblies require significant manual or physical exertion to move the header positioning assembly between orientations and oftentimes require multiple individuals to move the header positioning assembly between orientations. For example, as noted, the one or more individuals may need to manually remove pins, manually extend or retract cylinders (with resistance provided by the hydraulics), and manually lift or support mechanisms of the header and/or traction unit during conversion of the header positioning assembly.

Figures 2A, 2B:
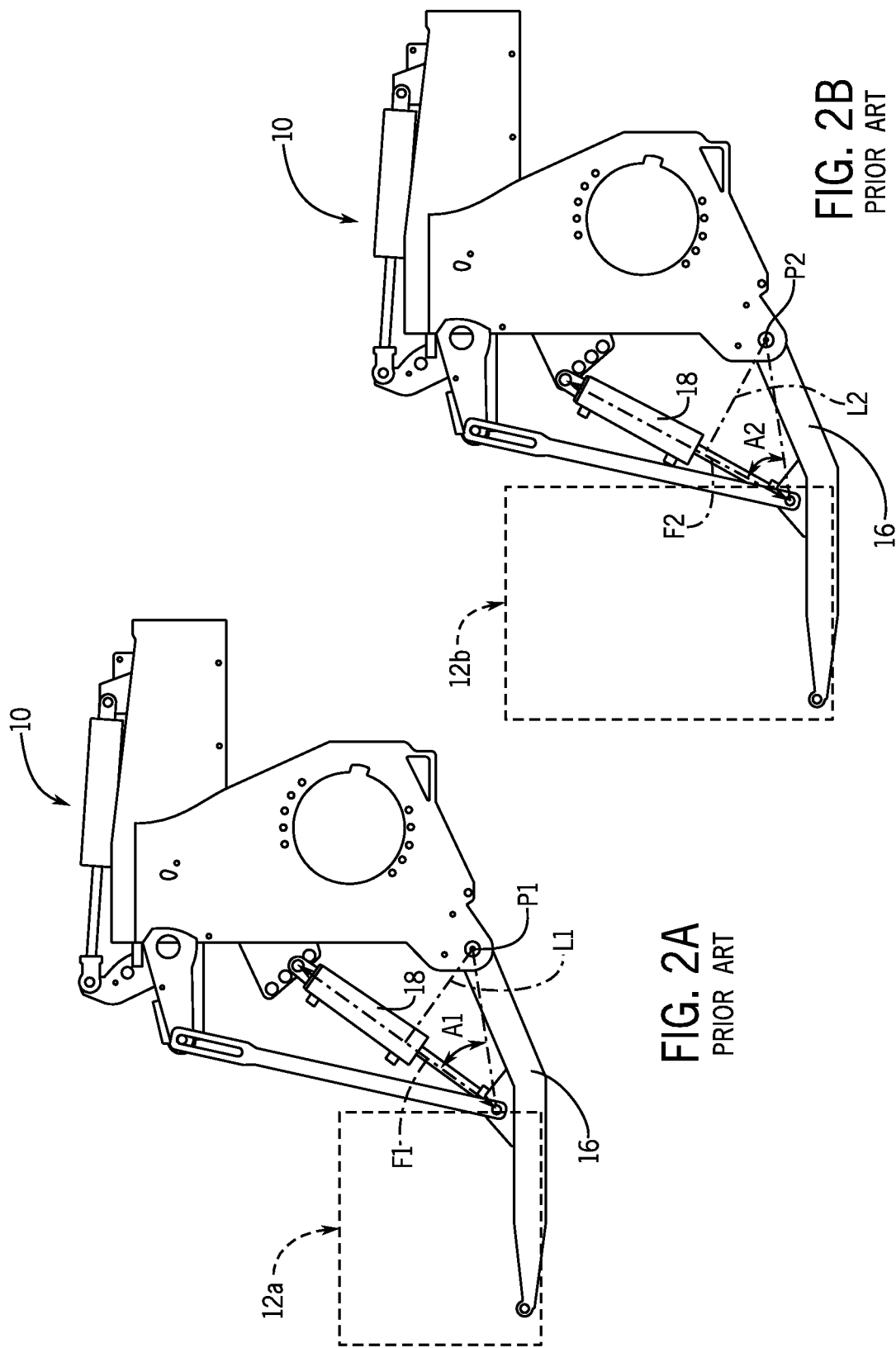
FIG. 2A is a side elevational view of the prior art header positioning assembly of FIG. 1 in a first orientation.
FIG. 2B is a side elevational view of the prior art header positioning assembly of FIG. 1 in a second orientation.

With reference to FIG. 1, one example of a conventional header positioning assembly 10 is illustrated and is shown in combination with one example of a header 12 and a portion of a traction unit 14. The conventional header positioning assembly 10 couples the header 12 to the traction unit 14. With further reference to FIGS. 2A and 2B, the conventional header positioning assembly 10 is shown in two different orientations or configurations. To move the conventional header positioning assembly 10 between these two orientations or configurations, a pin on each side of the header positioning assembly 10 is removed, a lift arm 16 is lifted or supported off of the ground, a lift or float cylinder 18 is manipulated to extend or retract the lift cylinder 18 to a proper length to align an end of each lift cylinder 18 with a desired one of a plurality of coupling locations or openings on a chassis of the traction unit 14. Then each pin is inserted through the aligned end of each lift cylinder 18 and the desired coupling location on the chassis. FIG. 2A shows an orientation or configuration of the header positioning assembly 10 associated with a header 12a having a lesser weight and form factor, and FIG. 2B shows an orientation or configuration of the header positioning assembly 10 associated with a header 12b having a greater weight and form factor. An angle A2 of the lift cylinder 20 in FIG. 2B is greater than an angle A1 of the lift cylinder 18 in FIG. 2A, thus providing the header positioning assembly 10 with a greater mechanical advantage in the orientation illustrated in FIG. 2B due to the longer lever arm L2 corresponding to the perpendicular distance from a pivot point P2 to the force F2 applied by the lift cylinder 18 compared to the relatively shorter lever arm L1 corresponding to the perpendicular distance from a pivot point P1 to the force F1 applied by the lift cylinder 18 in the FIG. 2A orientation.

Referring now to the present disclosure, one or more examples of agricultural work vehicles include a header positioning assembly configured to interchangeably couple a plurality of headers to the traction unit with very little or no manual or physical exertion by an operator. Moreover, the header positioning assembly ensures that each header has appropriate lift speed as well as floatation response and lateral tilt capabilities to consistently follow the contour of the ground. The header positioning assembly may have a plurality of orientations with each orientation associated with a particular type of header. Each orientation of the header positioning assembly is determined based on various factors, including the geometries, weights, and forward travel speed requirements of the particular header.

The present disclosure also includes one or more examples of a control system for controlling the agricultural work vehicles and the header positioning assemblies. The control system can control the agricultural work vehicles and header positioning assemblies in a variety of manners to move the header positioning assemblies between the plurality of orientations as desired.

Movement of the header positioning assembly between the plurality of orientations adjusts the mechanical advantage of the header positioning assembly to better accommodate different headers. Such movement of the header positioning assembly between orientations may occur automatically by actuating one or more actuators. In such an example, an operator may actuate an operator control input device (e.g., from a cab of the traction unit), which generates one or more control signals as a result of actuation and such one or more signals are communicated to a controller that then generates and communicates one or more control commands to the one or more actuators to adjust the header positioning assembly to a desired orientation. The operator may actuate the input device to adjust the orientation of the header positioning assembly either before or after coupling the header positioning assembly to the header. Additionally, in such an example, the plurality of headers may each include a first communication device (e.g., an emitter) and the traction unit or header positioning assembly may include a second communication device (e.g., a receiver) in wireless communication with each other. The first communication devices include unique characteristics associated with the type of header on which they positioned. When the second communication device comes into relatively close proximity to a particular one of the first communication devices, the second communication device communicates with the first communication device and as a result of such communication, the second communication device generates one or more control signals based on the unique characteristic of the one of the first communication devices. The one or more control signals are communicated to a controller, which then generates and communicates one or more control commands to the one or more actuators to adjust the header positioning assembly to a desired orientation. Such an example of a control system automatically detects the type of header that will be coupled to the traction unit and moves the header positioning assembly to an orientation associated with the detected type of header. Thus, an operator is not required to manually move any portion of the header positioning assembly to change the orientation of the header positioning assembly.

By increasing a mechanical advantage, the header positioning assembly is configured to support a header having a greater weight, and by decreasing a mechanical advantage, the header positioning assembly is configured to support a header having a lesser weight. Mechanical advantage of the header positioning assembly may be adjusted in variety of manners, including those manners briefly described above and hereinafter, and the manners described herein are only examples of the many manners of adjusting mechanical advantage. In one example, the header positioning assembly may be coupled to a chassis of a traction unit and the header positioning assembly may include one or more lift actuators used to support and move a header relative to the chassis. The one or more lift actuators may be moved relative to the chassis and/or the header to adjust a mechanical advantage of the header positioning assembly. The one or more lift actuators may be moved by one or more adjustment actuators, with one adjustment actuator coupled to each of the lift actuators. The adjustment actuators may move the lift actuators between a plurality of orientations and, therefore, provide a plurality of different mechanical advantages. In one example, as briefly described above, the adjustment actuators may be moved by an operator actuating an operator control input device. In another example, as also briefly described above, the adjustment actuators may be moved by the control system recognizing or detecting type of header to be coupled to the traction unit and communicating control commands based on the type of header to the adjustment actuator.

The following discussion of one or more example implementations of the assemblies and methods disclosed herein may sometimes focus on the traction unit example application of a windrower and header example applications of a rotary mower conditioner and a wide draper platform. In other examples, the assemblies and methods disclosed herein may be utilized with other types of traction units and other types of headers, such as those used with combine harvesters or other agricultural work vehicles. Further, the following describes one or more example implementations of the disclosed header positioning assembly in an agricultural work vehicle and the control system thereof, as shown in the accompanying figures of the drawings described briefly above. Generally, the disclosed header positioning assemblies, the agricultural work vehicles in which they are implemented, and the control systems thereof provide for better operation and responsiveness of each header carried by the agricultural work vehicle as well as easier and more efficient change-out of headers on agricultural work vehicles as compared to conventional systems and arrangements.

Figure 5:
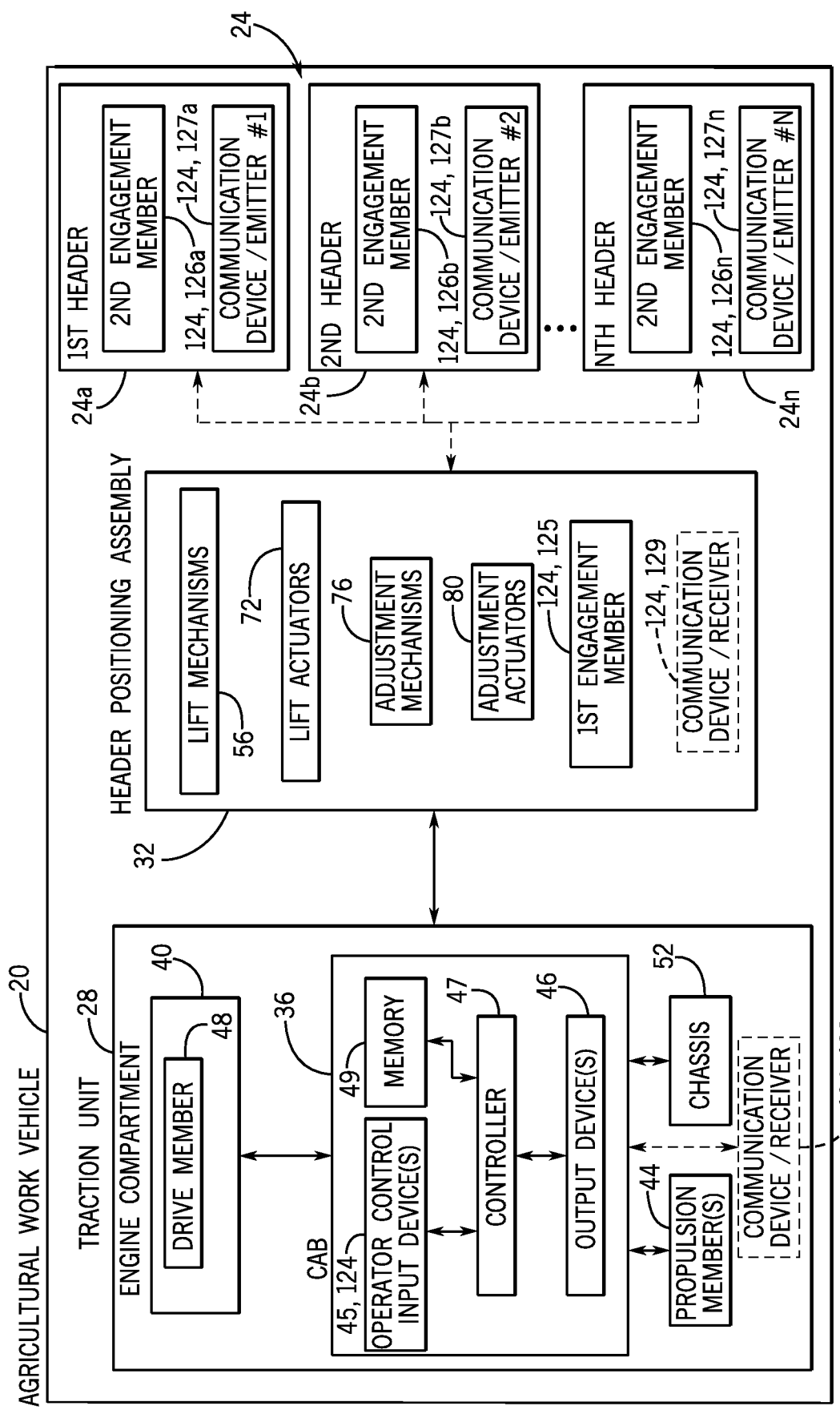
FIG. 5 is a schematic diagram of one example of an agricultural work vehicle, such as shown in FIG. 3 or 4, including a traction unit, a plurality of headers, and a header positioning assembly.

Referring now to FIG. 5, one example of an agricultural work vehicle 20 is illustrated and includes a plurality of interchangeable headers 24 (e.g., 24a, 24b, 24n), a traction unit 28, and a header positioning assembly 32. The agricultural work vehicle 20 is configured to include any number of headers 24 and each header 24 is configured to perform a unique agricultural operation. The traction unit 28 may be any of a wide variety of traction units 28 and generally includes an operator cab 36, an engine compartment 40, a drive member 48 (e.g., internal combustion engine, electric motor, etc.), and one or more propulsion members 44 (e.g., wheels, tracks, etc.). The cab 36 may have any of various configurations suitable to provide the location of the work vehicle 20 occupied by an operator. The operator cab 36 may include, for example, one or more operator control input devices 45 (e.g., levers, buttons, touch screen capabilities, or any other type of mechanical or electrical (digital or analog) activation to create and/or send signals to a controller) and one or more output devices 46 (e.g., monitors, displays, speakers, or any other type of audible and/or visual indicator configured to audibly and/or visually convey information to an operator), manipulatable and/or perceivable by the operator to control operation of the work vehicle 20. The operator cab 36 may also include, for example, one or more controllers 47 and associated memory 49. The one or more controllers 47 may be configured to receive, generate, communicate, and transmit signals and control commands from and/or to appropriate components of the agricultural work vehicle to effect operation of the agricultural work vehicle.

For example, an operator or external source may activate an operator control input device 45 which would create a control signal based on the activation of the input device 45. The control signal would be communicated by the input device 45 to the controller 47 and the controller 47 would act in accordance with the received control signal. For example, the controller 47 may generate one or more control commands and transmit the one or more control commands to one or more output devices 46 for consideration and action by the operator, and/or the controller could transmit one or more control commands to one or more other devices (e.g., adjustment actuators, lift actuators, lift cylinder, headers, engine, etc.) of the agricultural work vehicle 20 effecting action of the one or more other devices. The controller 47 may be configured to selectively communicate data/signals/commands to and retrieve data/signals from the memory 49.

The engine compartment 40 is capable of having many configurations and generally contains a drive member 48 such as, for example, a motor or engine for providing the necessary power to various components of the work vehicle 20. In one example, the drive member 48 may be a diesel powered internal combustion engine. Other components associated with the drive member 48 may also be housed or contained, at least in part, in the engine compartment 40. The work vehicle 20 may have one or more propulsion members 44 for moving the work vehicle 20 along a terrain. The type of propulsion member(s) 44 used with a work vehicle 20 may depend on the type of terrain and/or the type of work being performed by the work vehicle 20. For example, the propulsion member(s) 44 may be endless tracks, ground-engaging wheels, etc.

With reference also to FIG. 3, the agricultural work vehicle 20 is illustrated with one particular example of a header 24a and one particular example of a traction unit 28. In this illustrated example, the agricultural work vehicle 20 may be referred to as a windrower and the traction unit may be referred to as a tractor 28. The illustrated example of a header is a rotary mower conditioner 24a. The rotary mower conditioner 24a has a first set of characteristics including, but not limited to, a first size, a first shape or geometry, a first weight, and a first function, to perform an agricultural operation on a particular type of crop or crops (e.g., harvest or cut a crop). The header positioning assembly 32 couples the rotary mower conditioner 24a to a chassis 52 of the traction unit 28, moves the rotary mower conditioner 24a relative to the chassis 52 and the ground, and supports the rotary mower conditioner 24a during operation and transport.

Referring also to FIG. 4, the agricultural work vehicle 20 is illustrated with the same traction unit 28 and header positioning assembly 32, but with another example of a header 24b. In this illustrated example, the header may be referred to as a wide draper platform 24b. The wide draper platform 24b has a second set of characteristics including, but not limited to, a second size, a second shape or geometry, a second weight, and a second function, in order to perform an agricultural operation on a particular type of crop or crops (e.g., harvest or cut a crop). The first and second sets of characteristics of the respective headers 24a and 24b are different from each other. For example, the second size, second shape, and second weight are greater than the respective first size, first shape, and first weight. The header positioning assembly 32 couples the wide draper platform 24b to the chassis 52 of the traction unit 28, moves the wide draper platform 24b relative to the chassis 52 and the ground, and supports the wide draper platform 24b during operation and transport.

The header positioning assembly 32 of the present disclosure is configured to, among other things: alternatively couple the two illustrated examples of headers 24a, 24b, along with many other types of headers 24n, to the chassis 52 of the traction unit 28; move the plurality of headers 24a, 24b, 24n relative to the ground and the chassis 52 of the traction unit 28; support the plurality of headers 24a, 24b, 24n during operation and transport of the headers 24a, 24b, 24n; and adjust between various orientations easily, efficiently, and without significant or no manual or physical exertion by the an operator to accommodate the plurality of headers 24a, 24b, 24n.

Figure 6:
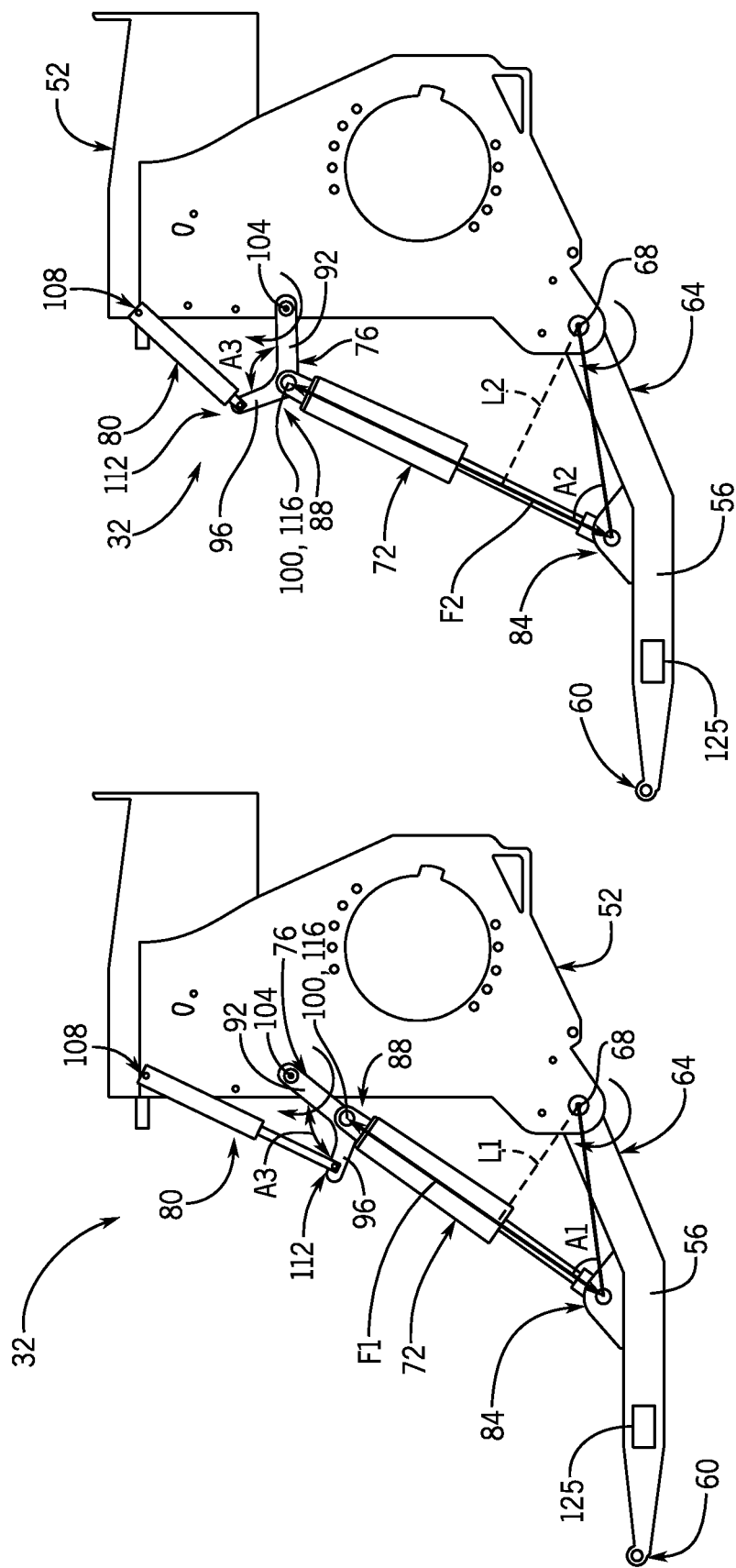
FIG. 6A is a side elevational view of one example of the header positioning assembly in FIGS. 3-5 in a first orientation.
FIG. 6B is a side elevational view of the header positioning assembly in FIG. 6A in a second orientation.

Referring now also to FIG. 6A, one example of the header positioning assembly 32 is illustrated. In the illustrated example, the header positioning assembly 32 includes a pair of lift arms or lift mechanisms 56 spaced-apart from one another on opposite sides of the header positioning assembly 32 (one lift mechanism is shown in the side elevational view of FIG. 6A). The lift mechanisms 56 are coupled to a header (not shown in FIG. 6A for simplicity and to illustrate aspects of the present disclosure) and to the chassis 52 of the traction unit 28. In one example, first ends 60 of the lift mechanisms 56 are coupled to a header and second ends 64 of the lift mechanisms 56 are rotatably coupled to the chassis 52 of the traction unit 28. Each lift mechanism 56 is configured to rotate about a pivot axis 68 defined through respective locations where the lift mechanisms 56 rotatably couple to the chassis 52. In the illustrated example, the pivot axes 68 are fixed relative to the chassis 52.

The illustrated example of the header positioning assembly 32 also includes a pair of combination lift and float actuators 72 (or float cylinders) (one combination lift and float actuator is shown in the side elevational view of FIG. 6A), with one combination lift and float actuator 72 coupled to each of the lift mechanisms 56. In some examples, the header positioning assembly 32 may include separate lift actuators and float actuators with the lift actuators performing functionalities of lift actuators and float actuators performing functionalities of float actuators. In the present illustrated example, the header positioning assembly 32 includes a combination of a lift actuator and a float actuator in a single actuator on both sides of the header positioning assembly 32 with the single actuator performing functionalities of both a lift actuator and a float actuator. For simplicity, the combination lift and float actuators 72 included in this illustrated example will be referred to as lift actuators 72 with it being understood that the lift actuators 72 of the illustrated example are capable of performing functionalities associated with both lift actuators and float actuators.

The lift actuators 72 are configured to apply forces to respective lift mechanisms 56 to adjust and maintain an orientation of the lift mechanisms 56 relative to the chassis 52 of the agricultural work vehicle 20. The header positioning assembly 32 also includes a pair of adjustment mechanisms (e.g., or pivot links) 76 and a pair of adjustment actuators 80 (one adjustment mechanism and one adjustment actuator is shown in the side elevational view of FIG. 6A). First ends 84 of the lift actuators 72 are rotatably coupled to a respective one of the lift mechanisms 56 and second ends 88 of the lift actuators 72 are rotatably coupled to a respective one of the adjustment mechanisms 76.

In the illustrated example, each adjustment mechanism 76 includes a first leg 92, a second leg 96 at an angle A3 to the first leg 92, and a pivot point 100 at an intersection of the first leg 92 and second leg 96. The adjustment mechanisms 76 are rotatably coupled to the chassis 52 of the traction unit 28 with the first legs 92 and rotate about a pivot axis 104 defined through locations where the adjustment mechanisms 76 rotatably couple to the chassis 52. The second ends 88 of the lift actuators 72 couple to a respective one of the pivot points 100 of the adjustment mechanisms 76. The adjustment actuators 80 include first ends 108 rotatably coupled to the chassis 52 of the traction unit 28 and second ends 112 rotatably coupled to a respective one of the second legs 96 of the adjustment mechanisms 76. In one example, the adjustment mechanisms 76 are configured to change a location and/or a direction of forces F1, F2 applied to respective lift mechanisms 56 by the respective lift actuators 72. This change in location and/or direction of the forces F1, F2 occurs without uncoupling the adjustment mechanisms 76 (or any other components of the header positioning assembly) from any of the other components of the agricultural work vehicle 20. The forces F1, F2 applied by the lift actuators 72 effect moments on the respective lift mechanisms 56 about second pivot axes 116 movable with respect to the chassis 52. In one example, the second pivot axes 116 may be at the pivot points 100 of the adjustment mechanisms 76 where the ends 88 of the lift actuators 72 couple to the adjustment mechanisms 76. In another example, the adjustment mechanisms 76 may be coupled to the first ends 84 of the lift actuators 72, the adjustment actuators 80 may be coupled to the adjustment mechanisms 76 to move the adjustment mechanisms 76 in a similar manner to that previously described, and the first ends 84 of the lift actuators 72 may be moved. In such an example, the forces F1, F2 applied by the lift actuators 72 effect moments on the respective lift mechanisms 56 about second pivot axes 116 movable with respect to the chassis 52 and the second pivot axes 116 may be at pivot points where the ends 84 of the lift actuators 72 couple to the adjustment mechanisms 76 and the lift mechanisms 56.

Since FIGS. 6A and 6B are side elevational views of the header positioning assembly 32, these figures show only one side of the header positioning assembly 32 and, more particularly, only show one lift mechanism 56, one lift actuator 72, one adjustment mechanism 76, and one adjustment actuator 80. It should be understood that the lift mechanism 56, the lift actuator 72, the adjustment mechanism 76, and the adjustment actuator 80 on the opposite side of the header positioning assembly 32 may operate in a similar or the same manner as the lift mechanism 56, the lift actuator 72, the adjustment mechanism 76, and the adjustment actuator 80 illustrated in FIGS. 6A and 6B and described herein.

The header positioning assembly 32 is illustrated in a first orientation or configuration associated with a first type of header 24a. In the illustrated example, this first orientation or configuration may be associated with the rotary mower conditioner 24a shown in FIG. 3. In this first orientation or configuration, a first angle A1 is formed between the lift actuator 72 (or direction of force F1) and the lift mechanism 56 and a first perpendicular distance or lever arm L1 is established between the pivot axis 68 and the lift actuator 72 (or direction of force F1). In this first orientation, the header positioning assembly 32 provides a first mechanical advantage established by the first distance or first lever arm L1 corresponding to a perpendicular distance from pivot axis 68 to the force F1 applied by the lift actuator 72. As indicated above, the lift actuator 72 may rotate relative to the lift mechanism 56. In the illustrated example, this rotation of the lift actuator 72 occurs by actuating the adjustment actuator 80, which acts on the second leg 96 of the adjustment mechanism 76 causing the adjustment mechanism 76 to rotate relative to the chassis 52 of the traction unit 28. Rotation of the adjustment mechanism 76 causes the lift actuator 72 to rotate relative to the adjustment mechanism 76, the chassis 52, and the lift mechanism 56. In this configuration, the lift actuator 72 can rotate between numerous orientations without moving the lift mechanism 56. The header positioning assembly 32 may be moved to a plurality of different orientations by actuating the adjustment actuator 80. These plurality of orientations may be associated with different types of headers 24.

Referring now to FIG. 6B, the header positioning assembly 32 is illustrated in a second orientation or configuration associated with a second type of header 24b. In the illustrated example, this second orientation or configuration may be associated with the wide draper platform 24b shown in FIG. 4. In this second orientation or configuration, the adjustment actuator 80 has been retracted (i.e., the length of the adjustment actuator decreased), thereby rotating the adjustment mechanism 76 (e.g., in a clockwise direction as illustrated in FIG. 6B) and rotating the lift actuator 72 (e.g., in a counterclockwise direction as illustrated in FIG. 6B) relative to the chassis 52 and the lift mechanism 56. In this second orientation, a second angle A2 is formed between the lift actuator 72 (or direction of force F2) and the lift mechanism 56 and a perpendicular second distance L2 is established between the pivot axis 68 and the lift actuator 72

(or direction of force F2). In this second orientation, the header positioning assembly 32 provides a second mechanical advantage established by the second distance or second lever arm L2 corresponding to a perpendicular distance from pivot axis 68 to the force F2 applied by the lift actuator 72. In this example, the second angle A2 is greater than the first angle A1 and the second distance or second lever arm L2 is greater than the first distance or first lever arm L1. By increasing the angle between the lift actuator 72 (or direction of force) and the lift mechanism 56 and increasing the distance or lever arm between the lift actuator 72 (or direction of force) and the pivot axis 68, a mechanical advantage of the header positioning assembly 32 has been increased from the first orientation or configuration shown in FIG. 6A to the second orientation or configuration shown in FIG. 6B. FIGS. 6A and 6B show only two of many possible orientations of the header positioning assembly 32. The many orientations of the header positioning assembly 32 allow the header positioning assembly 32 to have a variety of different mechanical advantages. The ability of the header positioning assembly 32 to selectively and easily increase or decrease its mechanical advantage allows the header positioning assembly 32 to support a wide variety of header types and facilitate easy interchangeability of headers 24 on the traction unit 28 without significant or any physical exertion by the operator.

With continued reference to FIGS. 1-6B and further reference to FIGS. 7-9, one example of a control system 123 of the agricultural work vehicle 20 will be described. The example of the control system 123 describe herein is capable of operating the agricultural work vehicles and the header positioning assemblies described herein in a variety of manners. The example operations, functions, actions, etc., of the control system 123 described herein may be only a portion of the many operations, functions, actions, etc., of the control system 123 and are provided to demonstrate principles of the present disclosure. It should be understood the example operations, functions, actions, etc., described herein with respect to the control system 123 are not intended to be limiting upon the present disclosure.

Moreover, the control system 123 of the agricultural device may have a variety of components and such components may be located in a variety of locations throughout the agricultural work vehicle 20. For example, the control system 123 may include one or more components in the cab 36, one or more components in the engine compartment 40, one or more components on the header positioning assembly 32, and/or one or more components on the headers 24, among other locations. The location of the components of the control system 123 throughout the agricultural work vehicle 20 is not an essential aspect of the present disclosure. Rather, it should be understood that the components of the control system 123 may be located anywhere throughout the agricultural work vehicle 20 in any concentration and/or configuration and all such possibilities are intended to be with in the spirit of the present disclosure.

Figure 7:
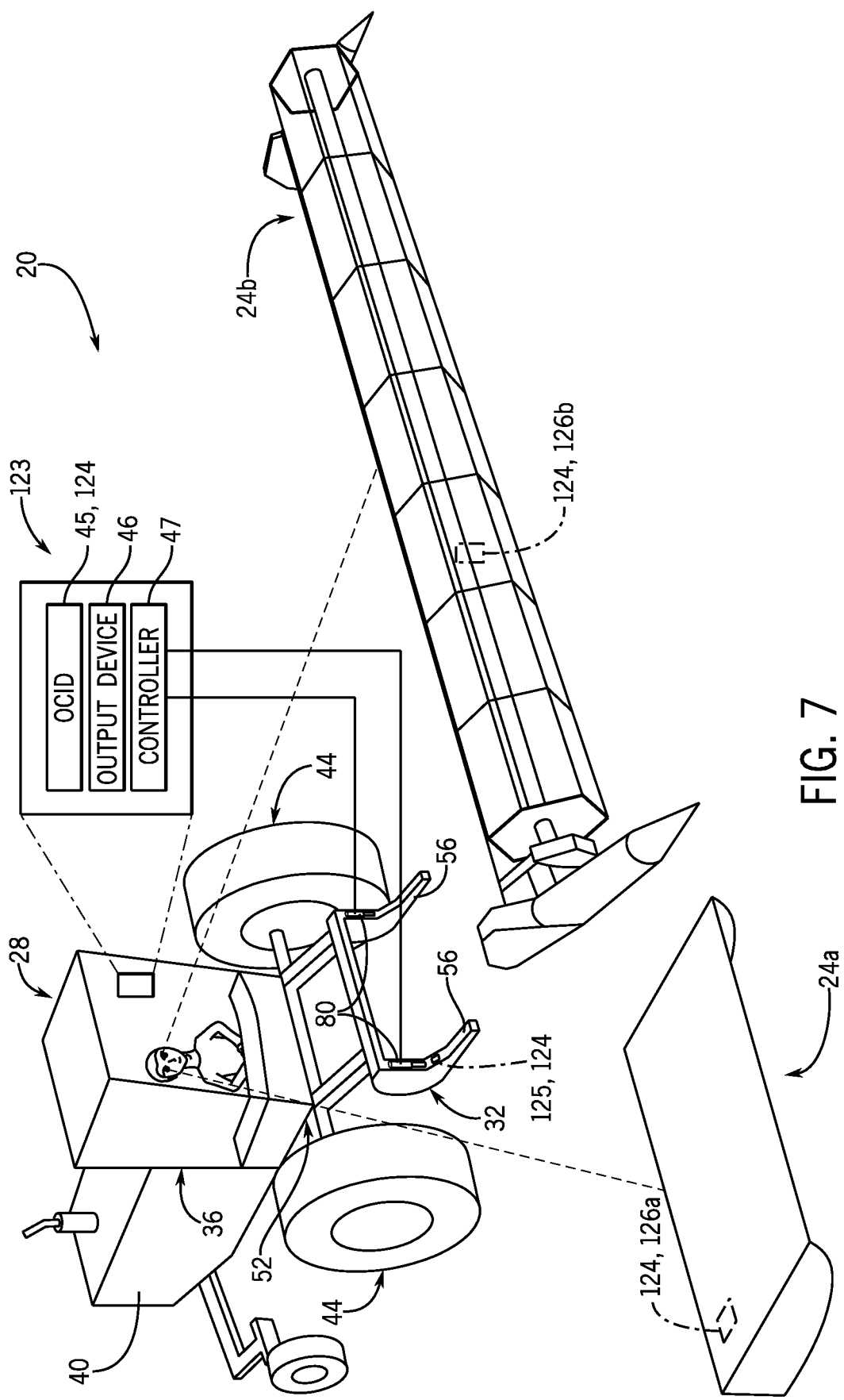
FIG. 7 is a top, front perspective view of one example of an agricultural work vehicle, such as shown in FIG. 3 or 4, including an example of a header positioning assembly, examples of interchangeable headers, and one example of at least a portion of a control system of the agricultural work vehicle illustrating one manner of operation of the control system.
Figure 8:
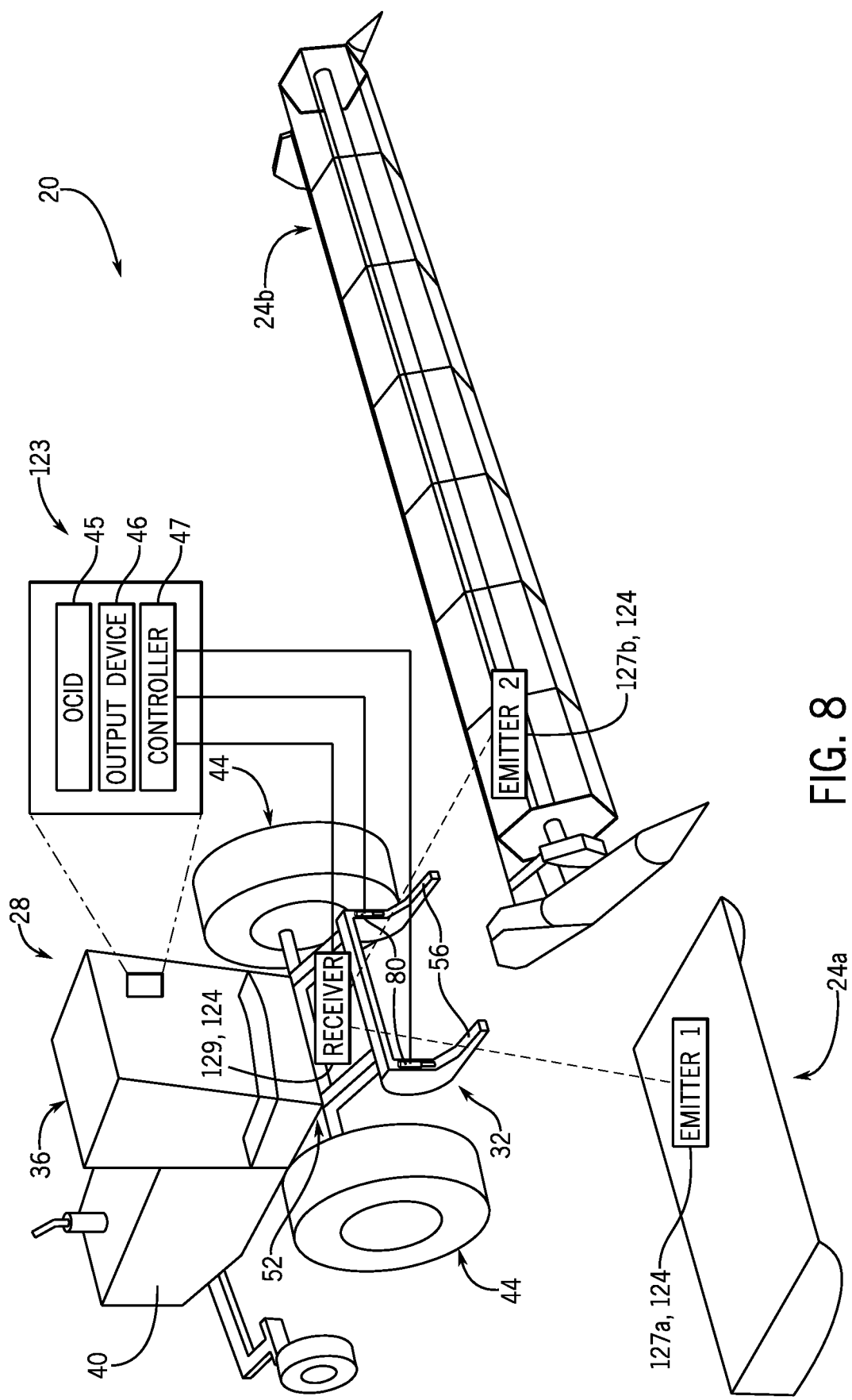
FIG. 8 is a top, front perspective view of the agricultural work vehicle of FIG. 7 illustrating another manner of operation of the control system.

With particular reference to FIGS. 7 and 8, the agricultural work vehicle 20 and the control system 123 are illustrated. In this example, the traction unit 28 is separated from a plurality of headers 24a, 24b and may be coupled to either of the headers 24a, 24b. The control system 123 of the agricultural work vehicle 20 is capable of moving the header positioning assembly 32 to an appropriate orientation based on the desired header 24a, 24b to be coupled to the traction unit 28. The control system 123 may move the header positioning assembly 32 to an appropriate orientation in a variety of manners. FIG. 7 illustrates one example of the control system 123 moving the header positioning assembly 32 between orientations and FIG. 8 illustrates another example of the control system 123 moving the header positioning assembly 32 between orientations. In both figures, the control system 123 includes at least one control input device 124 to move the header positioning assembly 32 between orientations. In FIG. 7, the control input device 124 is one or more operator control input devices (e.g., input device(s) 45), and the control system 123 requires an operator's observation/decision and actuation of one or more operator control input devices 45 to move the header positioning assembly 32 between orientations. FIG. 7 also illustrates another example of the control system 123. In this example, the control input device 124 may include one or more first engagement members 125 on the header positioning assembly 32 (a single first engagement member illustrated in the figures) and a plurality of second engagement members 126a, 126b with one of the plurality of second engagement members 126a, 126b on each of the headers 24a, 24b. In such an example, the control system 123 automatically moves the header positioning assembly 32 between orientations without requiring an operator's observation/decision and actuation of operator control input devices due to an engagement between the first engagement member(s) 125 and one of the second engagement members 126a, 126b. In FIG. 8, the control input device 124 includes a plurality of emitters 127 and a receiver 129 (see also FIG. 5), and the control system 123 automatically moves the header positioning assembly 32 between orientations without requiring an operator's observation/decision and actuation of operator control input devices due to communication between the emitters 127 and the receiver 129. Each example manner of operation of the control system 123 will be described in more detail below.

Referring to FIG. 7, an operator typically occupies the cab 36 of the agricultural device and is capable of viewing the environment surrounding the agricultural work vehicle 20. As indicated above, a plurality of headers 24a, 24b may be coupled to the traction unit 28. The operator observes the header or headers 24a, 24b proximate the traction unit 28, decides the appropriate header 24a, 24b to be coupled to the traction unit 28, and actuates an operator control input device 45 based on the appropriate header 24a, 24b. Actuation of the operator control input device 45 generates one or more control signals and the operator control input device 45 sends or communicates the one or more control signals to the controller 47. The one or more control signals are associated with a particular type of header 24a, 24b and such one or more control signals may be different based on the type of header 24a, 24b. The controller 47 receives the one or more control signals from the operator control input device 45 and generates one or more control commands based on the one or more control signals received and the type of header 24a, 24b. The controller 47 outputs or communicates the one or more control commands to the header positioning assembly 32 to effect movement of the header positioning assembly 32 to the proper orientation associated with the type of header 24a, 24b to be coupled to the traction unit 28. In one example, the controller 47 outputs or communicates the one or more control commands to the adjustment actuators 80 to actuate the adjustment actuators 80 to move the adjustment mechanisms 76, which in turn effect movement of the lift actuators 72 and the lift mechanisms 56.

Referring to FIG. 8, an operator typically occupies the cab 36 of the agricultural work vehicle 20 and is capable of viewing the environment surround the agricultural work vehicle 20. As indicated above, a plurality of headers 24a, 24b may be coupled to the traction unit 28. In one example, either the traction unit 28 or the header positioning assembly 32 may include a communication device 127, 129, and each of the headers 24a, 24b may include their own communication device 129, 127. In one example, the traction unit 28 or the header positioning assembly 32 includes a receiver 129 and each of the headers 24a, 24b includes a unique emitter 127a, 127b. The receiver 129 and the emitters 127a, 127b are configured to cooperate to generate a control signal unique to each of the headers 24a, 24b. In other examples, the configuration of the communication devices 127, 129 may be different. For example, each of the headers 24a, 24b may include a receiver 129 and a single emitter 127 may be positioned on one of the traction unit 28 or the header positioning assembly 32.

Returning to the illustrated example, the operator operates the traction unit 28 into relative close proximity to a desired one of the headers 24a, 24b for coupling to the traction unit 28. When the traction unit 28 moves into a predetermined range of the desired one of the headers 24a, 24b, the receiver 129 and the emitter 127a, 127b on the desired one of the headers 24a, 24b wirelessly communicate. The one of the emitters 127a, 127b generates and sends one or more control signals to the receiver 129 associated with the desired one of the headers 24a, 24b. The receiver 129 receives the one or more control signals from the emitter 127a, 127b and generates its own one or more control signals associated with the desired header 24a, 24b. The receiver 129 sends or communicates the one or more control signals to the controller 47. The controller 47 receives the one or more control signals from the receiver 129 and generates one or more control commands based on the one or more control signals received from the receiver 129 and the desired header 24a, 24b. The controller 47 outputs or communicates the one or more control commands to the header positioning assembly 32 to effect movement of the header positioning assembly 32 to the proper orientation associated with the desired header 24a, 24b to be coupled to the traction unit 28. In one example, the controller 47 outputs or communicates the one or more control commands to the adjustment actuators 80 to actuate the adjustment actuators 80, thereby moving the adjustment mechanisms 76, which in turn effect movement of the lift actuators 72 and the lift mechanisms 56.

Figure 9:
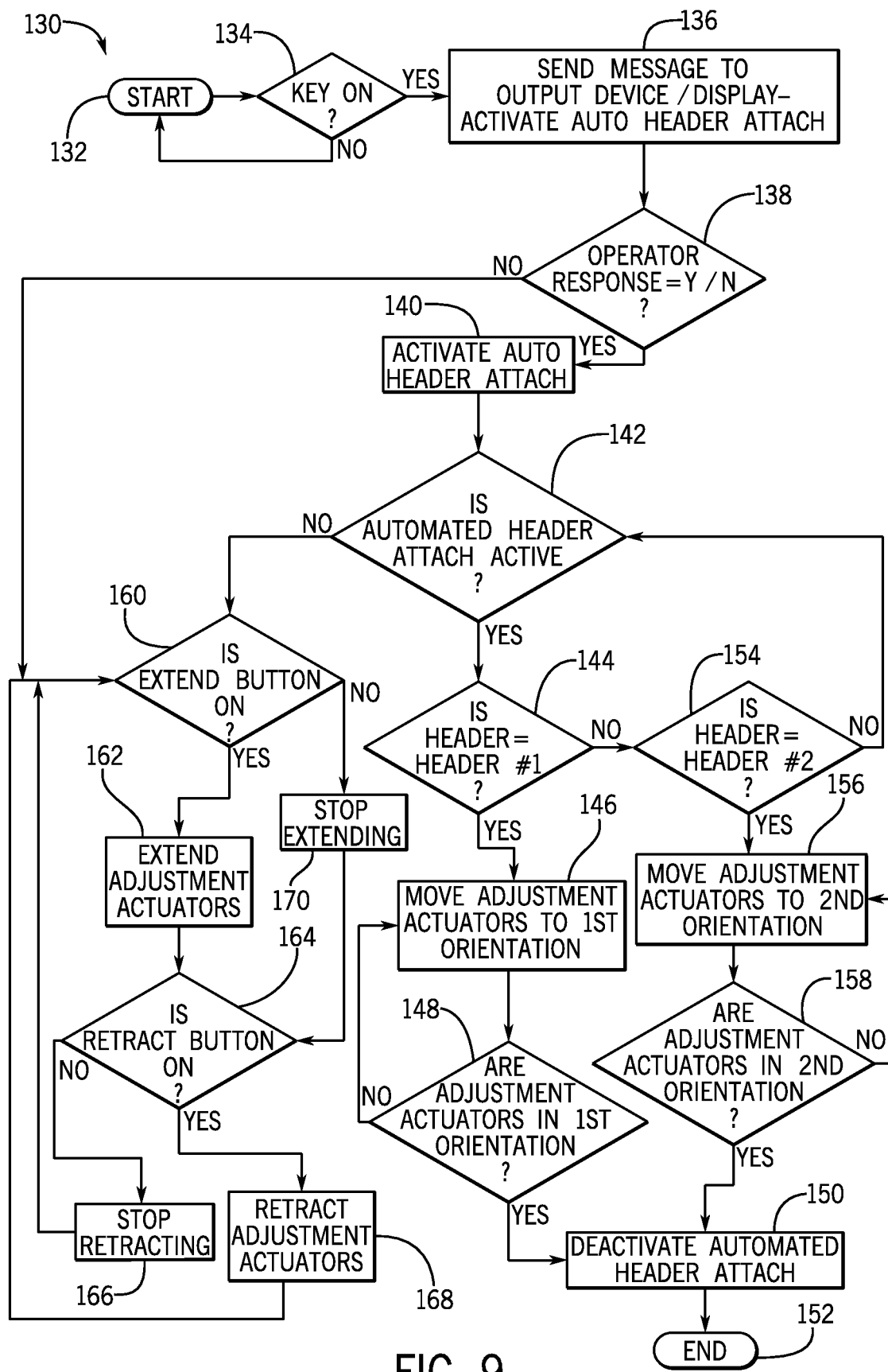
FIG. 9 is a flowchart for an example agricultural work vehicle control method.

Referring now also to FIG. 9, a flowchart illustrates one example of a method 130 of adjusting an orientation of a header positioning assembly 32 that may be performed by the control system 123 of the present disclosure. In this example, the flowchart considers both examples of operation illustrated in FIGS. 7 and 8. As can be appreciated in light of the disclosure, the order of operation within the method 130 is not limited to the sequential execution as illustrated in FIG. 9, but may be performed in one or more varying orders as applicable and in accordance with the present disclosure.

In one example, the method 130 begins as step 132. At step 134, the method 130 determines whether the ignition key of the traction unit 28 is turned on. If the ignition key is not turned on, the method 130 returns to again determine if the ignition key is turned on. If the ignition key is turned on, the controller 47 receives control signals from the ignition to indicate the ignition key is turned on and the method 130 proceeds to step 136. At step 136, the controller 47 generates and sends one or more control signals and/or commands to an output device 46, such as a visual display, to display text inquiring whether the operator wishes to activate "Auto Header Attach?". The operator considers the inquiry posed at step 136 and actuates an operator control input device 45 with the answer to the inquiry. The operator control input device 45 may be a wide variety of input devices including, but not limited to, a touch screen display (in which case the same device would be both the input device and the output device), a button, a lever, or other type of mechanical, electrical, or mechanical/electrical actuator. The method 130 proceeds to step 138 to determine the operators answer to the inquiry posed at step 136. If the operator actuated the operator control input device 45 to record an answer of "No", the operator control input device 45 generates a control signal associated with a "No" answer and communicates the control signal to the controller 47. The controller 47 receives the control signal associated with the "No" answer and the method 130 proceeds to step 160 (described in more detail below). If the operator actuated the operator control input device 45 to record an answer of "Yes", the operator control input device 45 generates one or more control signals associated with a "Yes" answer and communicates the one or more control signals to the controller 47. The controller 47 receives the one or more control signals associated with the "Yes" answer and the controller 47 generates one or more control signals and/or commands to activate automatic header attachment capability at step 140.

At step 142, the method 130 determines if the automatic header attachment feature is active. If the automatic header attachment is active, the method 130 proceeds to determine the one of the plurality of headers 24a, 24b to which the traction unit 28 is going to couple. With automatic header attachment active, the control system 123 utilizes the receiver 129 and emitters 127a, 127b to identify the header 24a, 24b to be coupled to the traction unit 28. The receiver 129 and emitters 127a, 127b have a predetermined range or distance of communication such that when the receiver 129 moves toward one of the emitters 127a, 127b and enters into the predetermined range, the receiver 129 and emitter 127a, 127b begin communicating. The predetermined range may be any range or distance and all of such possibilities are intended to be within the spirit and scope of the present disclosure. As the receiver 129 moves within the predetermined range of one of the emitters 127a, 127b, the method 130 determines at step 144 if the emitter 127a, 127b is a first emitter 127a associated with a first header 24a. At this step, the emitter 127a, 127b sends a control signal unique to the header 24a, 24b and the receiver 129 receives the control signal unique to the header 24a, 24b. The receiver 129 sends one or more control signals to the controller 47 associated with the header 24a, 24b and the controller 47 determines if the control signal associated with the header 24a, 24b is actually associated with a first header 24a. If the controller 47 determines the header is a first header 24a, the method 130 proceeds to step 146 where the controller 47 generates and sends one or more control commands to the adjustment actuators 80 to move the adjustment actuators 80 to a first orientation appropriately configured to couple to and support the first header 24a. The method 130 then proceeds to step 148 where the controller 47 confirms whether or not the adjustment actuators 80 are in their first orientation.

At step 148, the controller 47 receives feedback (e.g., in the form of one or more control signals) from the adjustment actuators 80 and the controller 47 determines if the feedback comports with the appropriate first orientation of the adjustment actuators 80. If the controller 47 determines the adjustment actuators 80 are not in their first orientation, the method 130 returns to step 146 and the controller 47 again attempts to move the adjustment actuators 80 to their first orientation. Returning to step 148, if the controller 47 determines the adjustment actuators 80 are in their first orientation, the method 130 proceeds to step 150 where the controller 47 deactivates the automated header attachment feature. The method 130 then ends at step 152.

Returning to step 144, if the controller 47 determines the detected header is not the first header 24a, the method 130 proceeds to step 154 where the controller 47 determines if the header is a second header 24b. At step 154 the method 130 determines if the emitter 127a, 127b is a second emitter 127b associated with a second header 24b. At this step, the one of the emitters 127a, 127b sends one or more control signals unique to the detected header 24a, 24b and the receiver 129 receives the one or more control signals unique to the detected header 24a, 24b. The receiver 129 sends one or more control signals to the controller 47 associated with the detected header 24a, 24b and the controller 47 determines if the one or more control signals associated with the detected header 24a, 24b is actually associated with a second header 24b. If the controller 47 determines the detected header is a second header 24b, the method 130 proceeds to step 156 where the controller 47 generates and sends one or more control commands to the adjustment actuators 80 to move the adjustment actuators 80 to a second orientation appropriately configured to couple to and support the second header 24b. The method 130 then proceeds to step 158 where the controller 47 confirms whether or not the adjustment actuators 80 are in their second orientation.

At step 158, the controller 47 receives feedback (e.g., in the form of one or more control signals) from the adjustment actuators 80 and the controller 47 determines if the feedback comports with the appropriate second orientation of the adjustment actuators 80. If the controller 47 determines the adjustment actuators 80 are not in their second orientation, the method 130 returns to step 156 and the controller 47 again attempts to move the adjustment actuators 80 to their second orientation. Returning to step 158, if the controller 47 determines the adjustment actuators 80 are in their second orientation, the method 130 proceeds to step 150 where the controller 47 deactivates the automated header attachment feature. The method 130 then ends at step 152.

The method 130 and associated steps 144-158 pertain to two different types of headers 24a, 24b, but it should be understood the method 130 can include additional steps to account for any number of headers 24a, 24b, 24n. In examples includes more than two headers 24a, 24b, 24n, the method 130 would include additional steps for each additional header 24n and such steps would be similar to steps 144-158 as appropriate. Furthermore, in one example, the steps 142-158 of the method 130 may be associated with the example of the agricultural work vehicle 20 and control system 123 illustrated in FIG. 8. Also, in other examples, the steps 142-158 of the method 130 may be associated with the examples of the agricultural work vehicle 20 and control system 123 illustrated in FIG. 7. In a first of the examples in FIG. 7, the determining steps of 144 and 154 may be performed by a visual observation of an operator and, as a result of the observation, the operator may actuate one or more operator control input devices 45 based on what is observed. Actuation of such one or more operator control input devices 45 causes steps 146 or 156 to be realized as described above. In a second of the examples in FIG. 7, the determining steps of 144 and 154 may be performed by engagement of the one or more first engagement members 125 on the header positioning assembly 32 and a particular one of the second engagement members 126a, 126b on a particular one of the headers 24a, 24b. Upon engagement, one or more control signals associated with the particular type of header 24a, 24b coupled to the header positioning assembly 32 would be sent to the controller 47, which would then result in steps 146 or 156 being realized as described above.

Returning now to step 142, if the method 130 determines the automatic header attachment feature is inactive, the method 130 proceeds to step 160. In the present example, the method 130 provides the option of adjusting the orientation of the header positioning assembly 32 by an operator actuating one or more operator control input devices 45 as desired. This operator adjustment via one or more input devices 45 is available if the automatic header attachment feature is not active. At step 160, the method 130 determines if the operator has activated an operator control input device 45 associated with extension of the adjustment actuators 80. If the operator control input device 45 associated with extension of the adjustment actuators 80 has been activated, the method 130 proceeds to step 162 where the controller 47 generates one or more control signals or commands and sends the one or more control signals or commands to the adjustment actuators 80. The adjustment actuators 80 receive the one or more control signals or commands and extend as instructed. This extension of the adjustment actuators 80 moves the header positioning assembly 32 into a desired orientation. In one example, the operator may manually determine when to stop extending the adjustment actuators 80 to manually position the header positioning assembly 32 in a desired orientation. In another example, an orientation of the header positioning assembly 32 may be predetermined and actuation of the operator control input device 45 associated with extension of the adjustment actuators 80 may extend the adjustment actuators 80 in a predetermined manner to position the header positioning assembly 32 in the predetermined orientation (e.g., a single button press (actuation of an operator control input device) or other single activation event to move the adjustment actuators and header positioning assembly to the predetermined orientation).

The method 130 continues to step 164 where the method 130 determines if an operator has activated an operator control input device 45 associated with retraction of the adjustment actuators 80. If the operator control input device 45 associated with the retraction of the adjustment actuators 80 has not been activated, the method 130 proceeds to step 166 where the controller 47 stops retracting the adjustment actuators 80 if the adjustment actuators 80 are retracting. In such a scenario, the controller 47 generates one or more control signals or commands and sends the one or more control signals or commands to the adjustment actuators 80 to stop retraction of the adjustment actuators 80. If the adjustment actuators 80 are not retracting, then the controller 47 may not generate and send one or more control signals or commands to the adjustment actuators 80. The method 130 then returns to step 160 for further inquiry as described above.

Returning to step 164, if the operator control input device 45 associated with retraction of the adjustment actuators 80 is activated, the method 130 proceeds to step 168 and the controller 47 generates one or more control signals or commands and sends the one or more control signals or commands to the adjustment actuators 80 to retract the adjustment actuators 80. This retraction of the adjustment actuators 80 moves the header positioning assembly 32 into a desired orientation. In one example, the operator may manually determine when to stop retracting the adjustment actuators 80 to manually position the header positioning assembly 32 in a desired orientation. In another example, an orientation of the header positioning assembly 32 may be predetermined and actuation of the operator control input device 45 associated with retraction of the adjustment actuators 80 may retract the adjustment actuators 80 in a predetermined manner to position the header positioning assembly 32 in the predetermined orientation. The method 130 then returns to step 160 for further inquiry.

Returning to step 160, if the method 130 determines the operator control input device 45 associated with extending the adjustment actuators 80 is not activated, the method 130 proceeds to step 170 where the controller 47 stops extending the adjustment actuators 80 if the adjustment actuators 80 are extending. In such a scenario, the controller 47 generates one or more control signals or commands and sends the one or more control signals or commands to the adjustment actuators 80 to stop extension of the adjustment actuators 80. If the adjustment actuators 80 are not extending, then the controller 47 may not generate and send one or more control signals or commands to the adjustment actuators 80. The method 130 then proceeds to step 164 for further proceedings as described above.

In one example, the steps 160-170 of the method 130 may be associated with the example of the agricultural work vehicle 20 and control system 123 illustrated in FIG. 7. Also, in another example, the steps 160-170 of the method 130 may be associated with the example of the agricultural work vehicle 20 and control system 123 illustrated in FIG. 8.

Thus, various example embodiments of a control system 123 have been described in which the header positioning assembly 32 may be adjusted between orientations. A single button press (actuation of an operator control input device) or other single activation event (movement of a first communication device into a predetermined range with a second communication device) may instruct the control system 123 to commence an automated orientation adjustment of the header positioning assembly 32. The control system 123 may verify that the header positioning assembly 32 is in the appropriate orientation and may further determine and execute suitable routines to properly orient the header positioning assembly 32.

Figure 10:
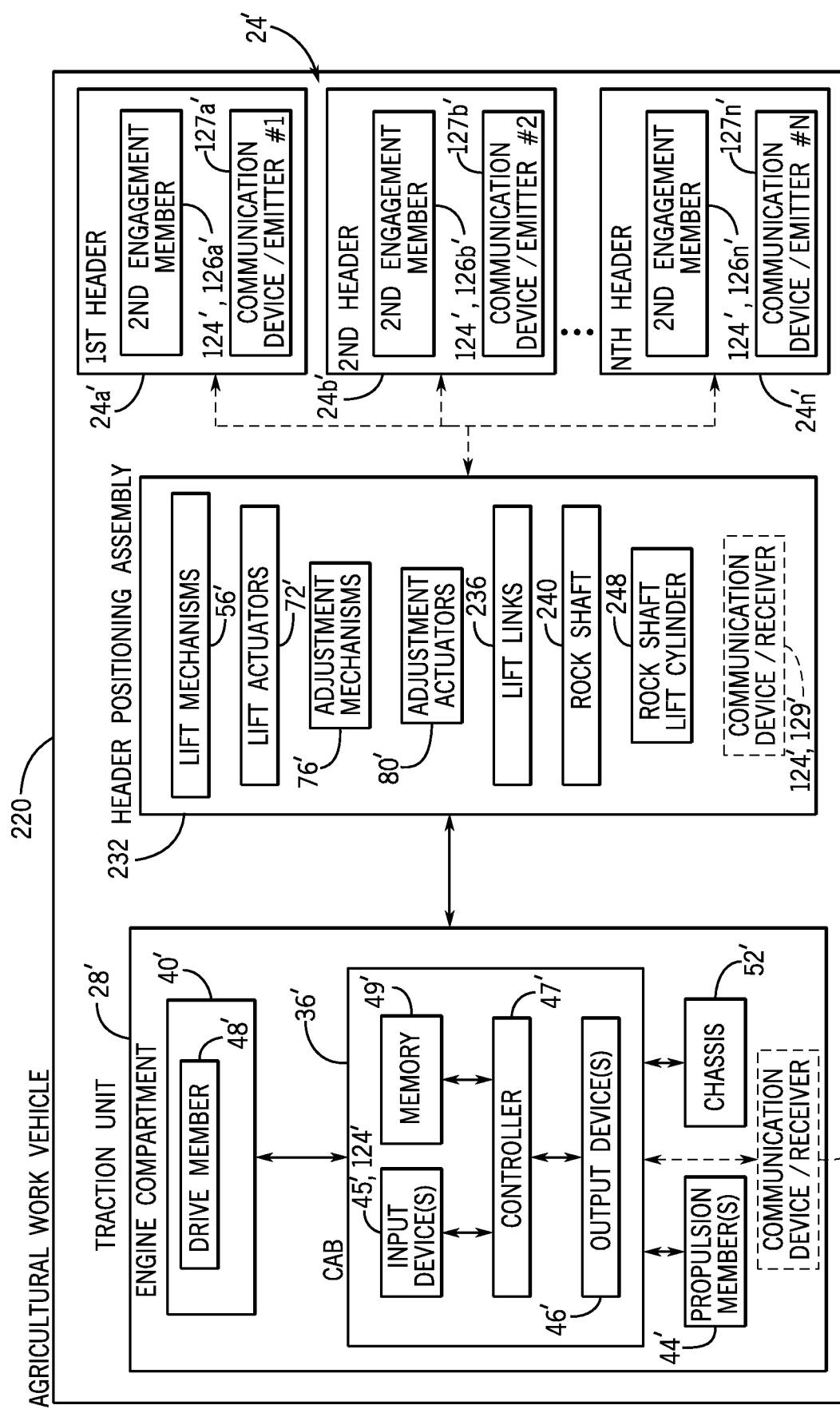
FIG. 10 is a schematic diagram of another example of an agricultural work vehicle including a traction unit, a plurality of headers, and a header positioning assembly.

Referring now to FIG. 10, another example of an agricultural work vehicle 220 is illustrated. The agricultural work vehicle illustrated in FIG. 10 may have some structural and operational similarities to the agricultural work vehicle 20 illustrated in FIG. 5. Thus, like structure between the two examples will be identified with like reference numbers and a prime symbol in the example of FIG. 10. The agricultural work vehicle 220 includes a plurality of interchangeable headers 24a', 24b', 24n', a traction unit 28', and a header positioning assembly 232.

Referring now to FIG. 11A, one example of the header positioning assembly 232 included in the agricultural work vehicle 220 of FIG. 10 is illustrated. In the illustrated example, the header positioning assembly 232 includes a pair of lift arms or lift mechanisms 56' spaced-apart from one another on opposite sides of the header positioning assembly 232 (one lift mechanism is shown in the side elevational view of FIG. 11A). The lift mechanisms 56' are coupled to a header 24a', 24b', 24n' and to a chassis 52' of a traction unit 28'. In one example, first ends 60' of the lift mechanisms 56' are coupled to a header and second ends 64' of the lift mechanisms 56' are rotatably coupled to the chassis 52' of the traction unit 28'. Each lift mechanism 56' is configured to rotate about a pivot axis 68' defined through locations where the lift mechanisms 56' rotatably couple to the chassis 52'. These pivot axes 68' are fixed relative to the chassis 52'.

The illustrated example of the header positioning assembly 232 also includes a pair of float actuators 72' (one float actuator is shown in the side elevational view of FIG. 11A), with one float actuator 72' coupled to each of the lift mechanisms 56'. The header positioning assembly 232 also includes a pair of lift links 236 spaced-apart from one another on opposite sides of the header positioning assembly 232 (one lift link is shown in the side elevational view of FIG. 11A). The header positioning assembly 232 further includes a rock shaft 240 rotatably coupled to the chassis 52' of the traction unit 28' and extending between sides of the header positioning assembly 232. First ends 244 of the lift links 236 are rotatably coupled to the rock shaft 240. A lift actuator 248 is coupled to the rock shaft 240 and is configured to rotate the rock shaft 240 relative to the chassis 52', which applies forces to the lift link 236 to ultimately lift and lower the lift mechanisms 56', thereby lifting and lowering headers 24a', 24b', 24n' coupled to the lift mechanisms 56'. In the example illustrated in FIGS. 10, 11A, and 11B, the header positioning assembly 232 includes both float actuators 72' and a lift actuator 248 with the float actuators 72' performing functionalities associated with float actuators and the lift actuator 248 performing functionalities of a lift actuator. In the example illustrated in FIGS. 5, 6A, and 6B, the header positioning assembly 32 included combination lift and float actuators 72, but for simplicity the combination was referred to as lift actuators 72. It should be understood that while the example illustrated in FIGS. 10, 11A, and 11B include separate float actuators 72' and lift actuator 248, both the float actuators 72' and the lift actuator 248 may be referred to as lift actuators.

The header positioning assembly 232 also includes a pair of adjustment mechanisms or pivot links 76' and a pair of adjustment actuators 80' (one adjustment mechanism and one adjustment actuator are shown in the side elevational view of FIG. 11A). First ends 84' of the lift actuators 72' are rotatably coupled to a respective one of the lift mechanisms 56' and second ends 88 of the lift actuators 72' are rotatably coupled to the chassis 52' of the traction unit 28'. In the illustrated example, each adjustment mechanism 76' includes a first leg 92', a second leg 96' at an angle A3' to the first leg 92', and a pivot point 100' at an intersection of the first leg 92' and the second leg 96'. Each adjustment mechanism 76' is rotatably coupled to a respective one of the lift mechanisms 56' and the respective first end 84' of the lift actuators at the pivot point 100'. Second ends 252 of the lift links 236 are rotatably coupled to a respective one of the second legs 96' of the adjustment mechanisms 76'. The adjustment actuators 80' include first ends 108' rotatably coupled to a respective one of the lift mechanisms 56' and second ends 112' rotatably coupled to a respective one of first legs 92' of the adjustment mechanisms 76'.

Since FIGS. 11A and 11B are side elevational views of the header positioning assembly 232, the figures show only one side of the header positioning assembly 232 and, more particularly, only show one lift mechanism 56', one lift actuator 72', one lift link 236, one adjustment mechanism 76', and one adjustment actuator 80'. It should be understood that the lift mechanism 56', the lift actuator 72', the lift link 236, the adjustment mechanism 76', and the adjustment actuator 80' on the opposite side of the header positioning assembly 232 are configured to operate in a similar or the same manner as the lift mechanism 56', the lift actuator 72', the lift link 236, the adjustment mechanism 76', and the adjustment actuator 80' illustrated in FIGS. 11A and 11B and described herein.

The header positioning assembly 232 is illustrated in a first orientation or configuration associated with a first type of header 24a'. In the illustrated example, this first orientation or configuration may be associated with the rotary mower conditioner 24a' shown in FIG. 3. In this first orientation or configuration, a first angle A1' is formed between the lift link 236 (or direction of force F1') and the pivot axis 68' where the lift mechanism 56' is rotatably coupled to the chassis 52', and a first perpendicular distance or lever arm L1' is established between the lift link 236 (or direction of force F1') and the pivot axis 68' where the lift mechanism 56' is rotatably coupled to the chassis 52'. In this first orientation, the header positioning assembly 232 provides a first mechanical advantage established by the first distance or first lever arm L1' corresponding to a perpendicular distance from pivot axis 68' to the force F1' applied by and along the lift link 236. As indicated above, the adjustment mechanism 76' is rotatable about the pivot point 100' at the intersection of the first leg 92' and second leg 96'. This rotation of the adjustment mechanism 76' occurs by actuating the adjustment actuator 80', which acts on the first leg 92' of the adjustment mechanism 76' causing the adjustment mechanism 96' to rotate relative to the chassis 52' of the traction unit 28'. Rotation of the adjustment mechanism 76' causes the lift link 236 to rotate relative to the adjustment mechanism 76', the chassis 52', and the lift mechanism 56'. The header positioning assembly 232 may be moved to a plurality of different orientations by actuating the adjustment actuator 80'. These plurality of orientations may be associated with different types of headers.

Referring now to FIG. 11B, the header positioning assembly 232 is illustrated in a second orientation or configuration associated with a second type of header 24b'. In the illustrated example, this second orientation or configuration may be associated with the wide draper platform 24b' shown in FIG. 4. In this second orientation or configuration, the adjustment actuator 80' has been extended (i.e., length of the adjustment actuator increased), thereby rotating the adjustment mechanism 76' (e.g., in a counter-clockwise direction as illustrated in FIG. 11B) and rotating the lift link 236 (e.g., in a clockwise direction as illustrated in FIG. 11B) relative to the chassis 52' and the lift mechanism 56'. Moreover, the lift actuator 248 has extended from its position in the first orientation and such extension has rotated the rock shaft 240 in a counter-clockwise direction to correspond to the movement of the adjustment actuator 80'. In this second orientation, a second angle A2' is formed between the lift link 236 (or direction of force F2') and the pivot axis 68' where the lift mechanism 56' is rotatably coupled to the chassis 52', and a second perpendicular distance L2' is established between the lift link 236 (or direction of force F2') and the pivot axis 68' where the lift mechanism 56' is rotatably coupled to the chassis 52'. In this second orientation, the header positioning assembly 232 provides a second mechanical advantage established by the second distance or second lever arm L2' corresponding to a perpendicular distance from pivot axis 68' to the force F2' applied by and along the lift link 236. In this example, the first angle A1' is greater than the second angle A2' and the second distance or second lever arm L2' is greater than the first distance or first lever arm L1'. Furthermore, the second end 252 of the lift link 236 is lower in the second orientation or configuration than in the first. By decreasing the angle between the lift link 236 and the pivot axis 68', lowering the second end 252 of the lift link 236, and increasing the distance or lever arm between the lift link 236 and the pivot axis 68', a mechanical advantage of the header positioning assembly 232 has been increased from the first orientation or configuration shown in FIG. 11A to the second orientation or configuration shown in FIG. 11B. FIGS. 11A and 11B show only two of many possible orientations of the header positioning assembly 232. The many orientations of the header positioning assembly 232 allow the header positioning assembly 232 to have a variety of different mechanical advantages. The ability of the header positioning assembly 232 to selectively and easily increase or decrease its mechanical advantage allows the header positioning assembly 232 to support a wide variety of header types and facilitate easy conversion of headers 24' on the traction unit 28' without significant or any physical exertion by an operator.

It should be understood that the control system 123 and associated illustrations, diagrams, flowcharts, methods, steps, and operations described above may also apply to the embodiment illustrated in FIGS. 10, 11A, and 11B as appropriate, and such control system, illustrations, diagrams, flowcharts, methods, steps, and operations may be altered to accommodate any differences between the embodiment illustrated in FIGS. 10, 11A, and 11B, and the other embodiments illustrated and described above.

Figure 12B:
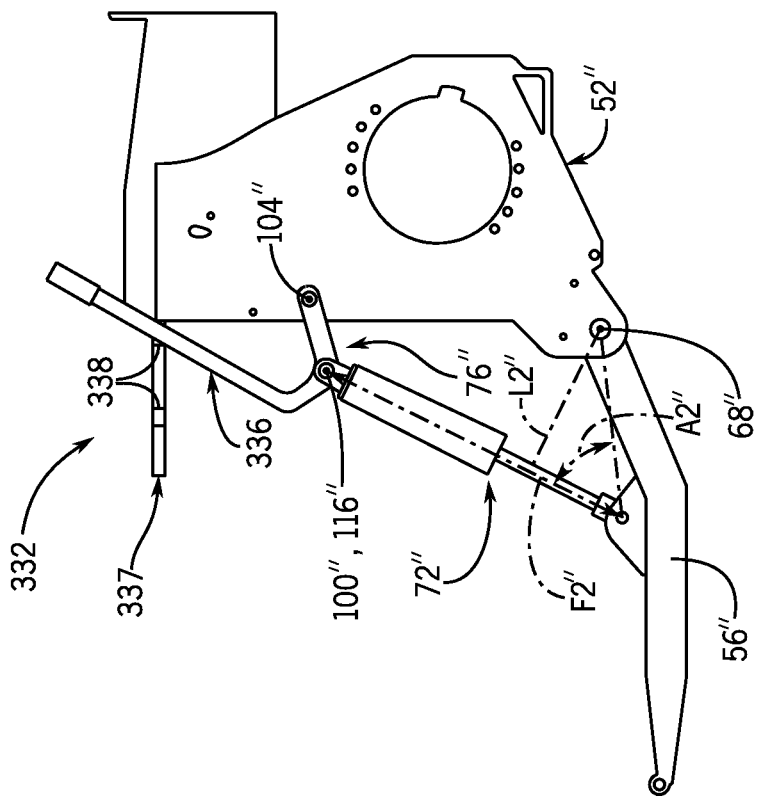
FIG. 12B is a side elevation view of the portion of the agricultural work vehicle and the portion of the header positioning assembly in FIG. 12B in a second orientation.
Figure 12A:
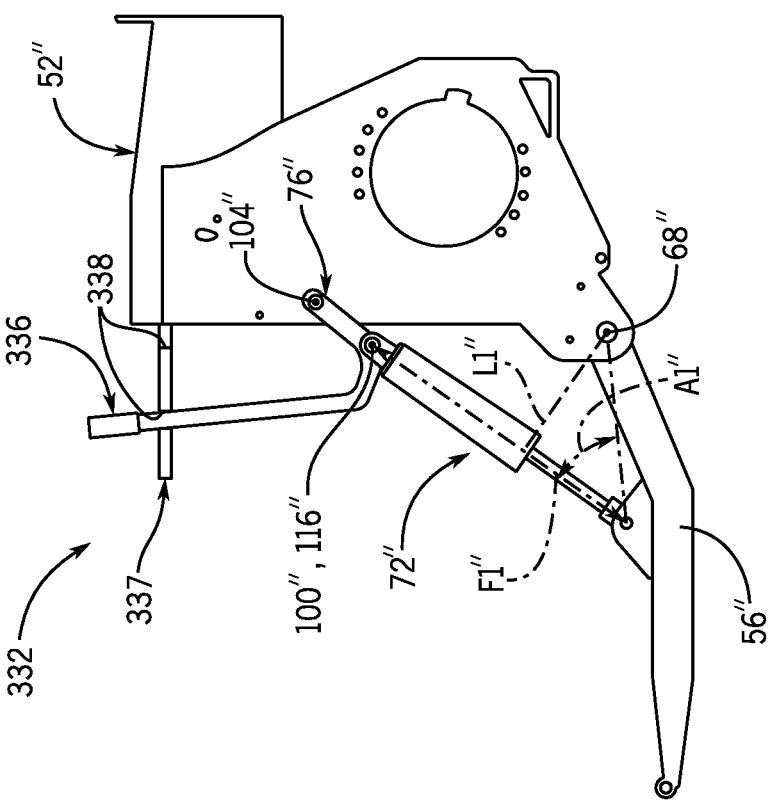
FIG. 12A is a side elevational view of another example of a portion of an agricultural work vehicle including a portion of another example of a header positioning assembly in a first orientation.

Referring now to FIGS. 12A and 12B, another example of a header positioning assembly 332 is illustrated and is configured to be included in any of the agricultural work vehicles described herein or alternatives thereof. The header positioning assembly 332 and portion of an agricultural work vehicle illustrated in FIGS. 12A and 12B may have some structural and operational similarities to the header positioning assemblies and agricultural work vehicles illustrated in FIGS. 4-11 and described herein. Thus, like structure between the example illustrated in FIGS. 12A and 12B and the other examples will be identified with like reference numbers and a double prime symbol in the example of FIGS. 12A and 12B.

Since FIGS. 12A and 12B are side elevational views of the header positioning assembly 332, the figures show only one side of the header positioning assembly 332 and, more particularly, only show one lift mechanism 56", one lift actuator 72", and one adjustment mechanism 76". It should be understood that the lift mechanism 56", the lift actuator 72", and the adjustment mechanism 76" on the opposite side of the header positioning assembly 332 may operate in a similar manner as the lift mechanism 56", the lift actuator 72", and the adjustment mechanism 76" illustrated in FIGS. 12A and 12B and described herein.

In this example, the header positioning assembly 332 includes a handle 336 coupled to an adjustment mechanism 76" and the handle 336 is configured to be manipulated to manually move the adjustment mechanism 76". In one example, the handle 336 may be unitarily formed as one-piece with the adjustment mechanism 76". In other examples, the handle 336 may be coupled to the adjustment mechanism 76" in a variety of manners including, but not limited to, welding, bonding, fastening, etc. The handle 336 is moveable between a plurality of positions corresponding with the plurality of orientations of the header positioning assembly 332. The handle 336 may be maintained in the plurality of positions in a wide variety of manners. In the illustrated example, a securement member 337 is coupled to the chassis 52" and includes a plurality of recesses 338 for receiving and securing the handle 336 in the plurality of positions. The handle 336 of the present header positioning assembly 332 is configured to provide an operator with a mechanical advantage to easily and without significant physical exertion move the header positioning assembly 332 between a plurality of orientations in order to accommodate a plurality of different types of headers having a variety of different characteristics.

The handle 336 is used in place of the adjustment actuator described in other examples of the header positioning assembly. In other examples, the handle 336 may be used in conjunction with the adjustment actuator. In the illustrated example, the handle 336 is shown included in a header positioning assembly similar to that shown in FIGS. 6A and 6B. It should be understood the handle 336 may be included in the example of the header positioning assembly illustrated in FIGS. 11A and 11B, or other types of header positioning assemblies. Returning to the illustrated example, movement or rotation of the handle 336 rotates the adjustment mechanism 76", which has the same result on the header positioning assembly as previously described examples of the header positioning assembly.

Figure 13:
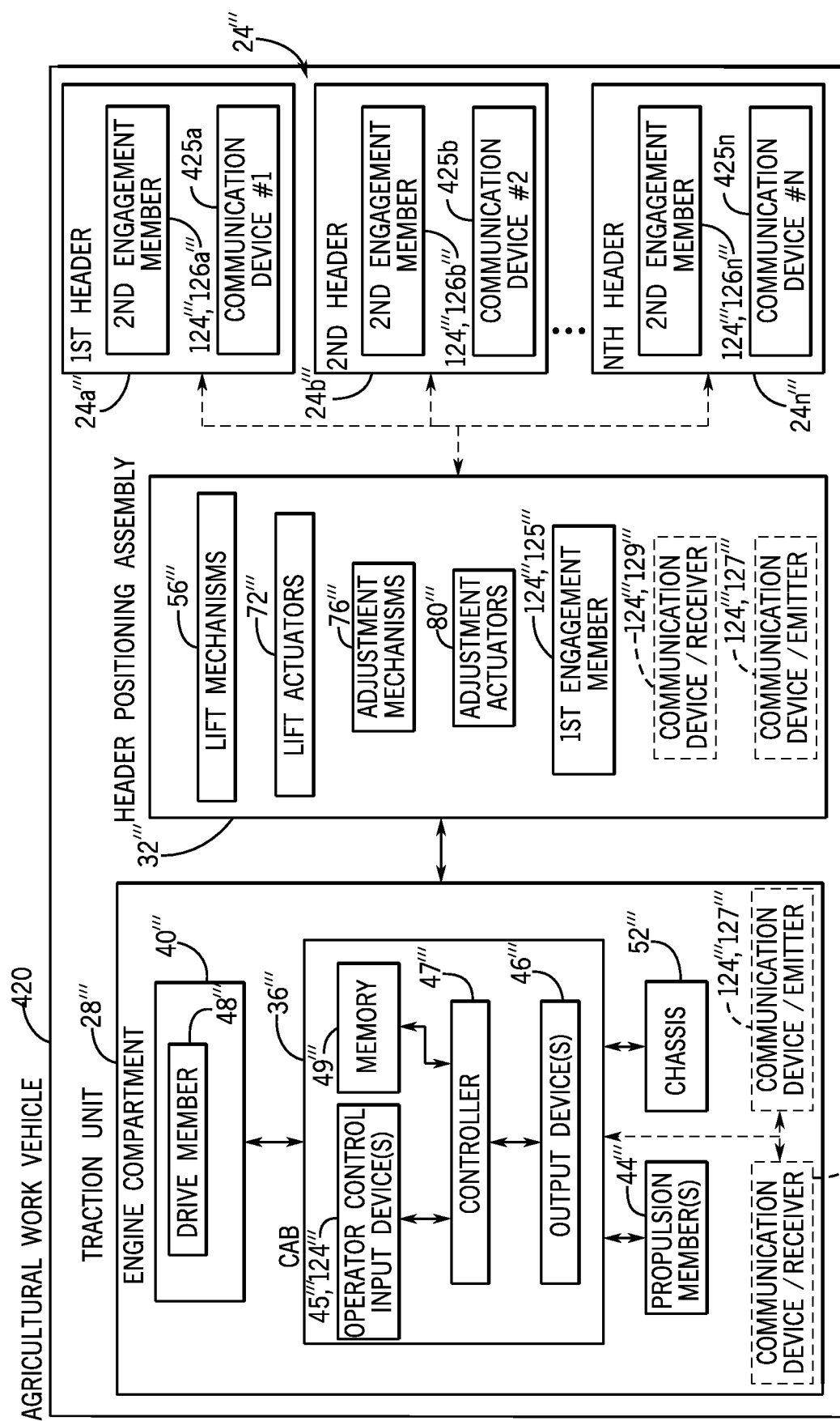
FIG. 13 is a schematic diagram of another example of an agricultural work vehicle including a traction unit, a plurality of headers, and a header positioning assembly.
Figure 14:
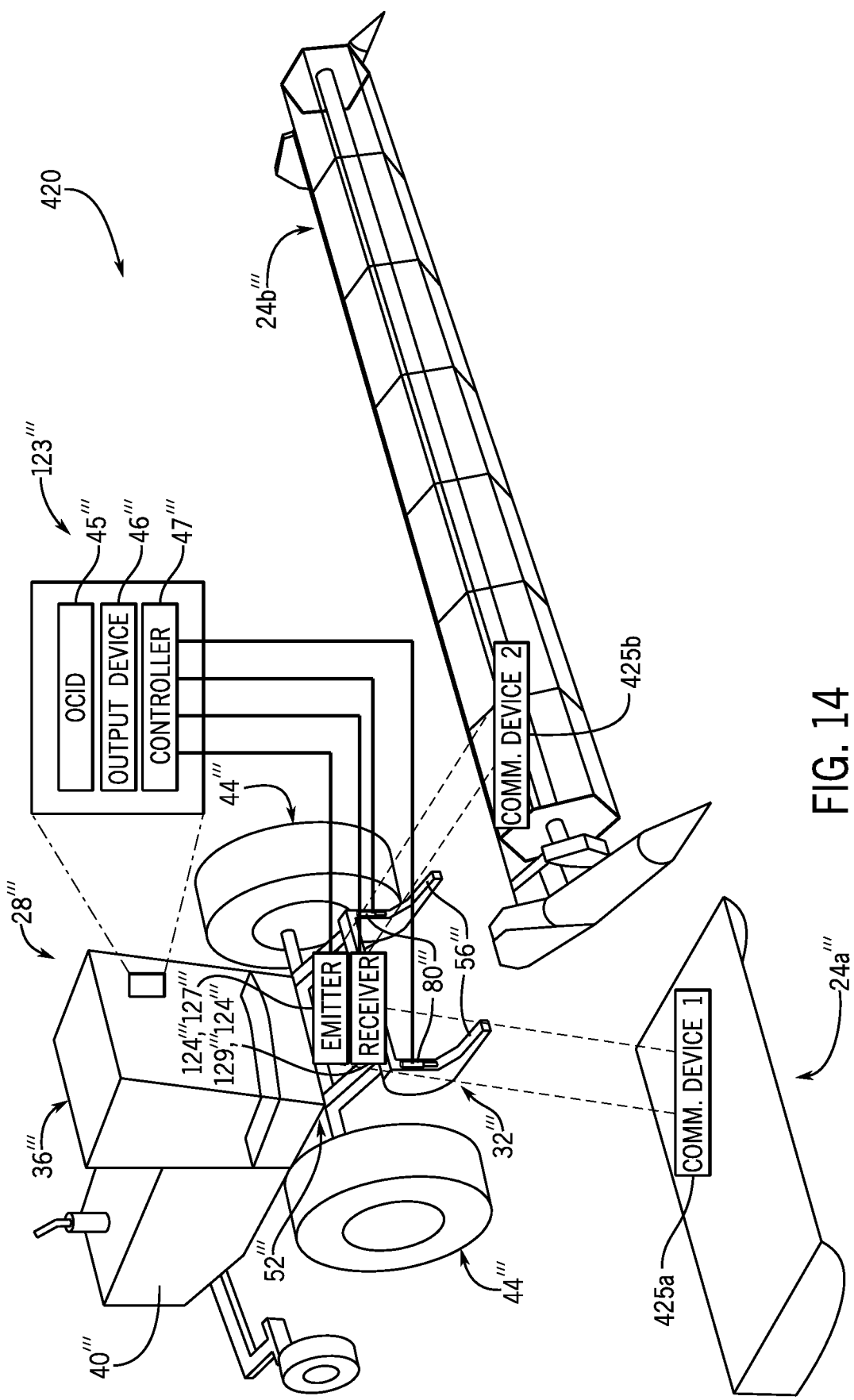
FIG. 14 is a top, front perspective view of one example of an agricultural work vehicle, such as shown in FIGS. 3, 4, and schematically in FIG. 13, including an example of a header positioning assembly, examples of interchangeable headers, and one example of at least a portion of a control system of the agricultural work vehicle illustrating one manner of operation of the control system

Rotation of the handle 336 is configured to move the header positioning assembly 332 to a variety of orientations for accommodating a variety of types of headers. For example, FIG. 12A shows the header positioning assembly 332 in a first orientation or configuration and FIG. 12B shows the header positioning assembly 332 in a second orientation or configuration. In the first orientation or configuration illustrated in FIG. 12A, a first angle A1" is formed between the lift actuator 72 (or direction of force F1") and the pivot axis 68' where the lift mechanism 56'" is rotatably coupled to the chassis 52", and a first perpendicular distance or lever arm L1" is established between the lift actuator 72" (or direction of force F1") and the pivot axis 68' where the lift mechanism 56' is rotatably coupled to the chassis 52'. In this first orientation, the header positioning assembly 332 provides a first mechanical advantage established by the first distance or first lever arm L1" corresponding to a perpendicular distance from pivot axis 68" to the force F1" applied by and along the lift actuator 72". In the second orientation or configuration illustrated in FIG. 12B, a second angle A2" is formed between the lift actuator 72 (or direction of force F2") and the pivot axis 68' where the lift mechanism 56'" is rotatably coupled to the chassis 52", and a second perpendicular distance or lever arm L2" is established between the lift actuator 72" (or direction of force F2") and the pivot axis 68' where the lift mechanism 56' is rotatably coupled to the chassis 52'. In this second orientation, the header positioning assembly 332 provides a second mechanical advantage established by the second distance or second lever arm L2" corresponding to a perpendicular distance from pivot axis 68" to the force F2" applied by and along the lift actuator 72". In the second orientation or configuration, the header positioning assembly 332 has a greater mechanical advantage and is configured to support a header of greater size and weight than when the header positioning assembly 332 is positioned in the first orientation or configuration. Referring now to FIGS. 13 and 14, another example of an agricultural work vehicle 420 is illustrated. The agricultural work vehicle illustrated in FIGS. 13 and 14 may have some structural and operational similarities to the agricultural work vehicles 20, 220 illustrated in FIGS. 5-8 and 10-11B. Thus, like structure between the examples will be identified with like reference numbers and a triple prime symbol in the example of FIGS. 13 and 14.

Referring now to FIGS. 13 and 14, another example of an agricultural work vehicle 420 is illustrated. The agricultural work vehicle illustrated in FIGS. 13 and 14 may have some structural and operational similarities to the agricultural work vehicles 20, 220 illustrated in FIGS. 5-8 and 10-11B. Thus, like structure between the examples will be identified with like reference numbers and a triple prime symbol in the example of FIGS. 13 and 14.

The agricultural work vehicle 420 illustrated in FIGS. 13 and 14 includes many similarities to the agricultural work vehicle 20 illustrated in FIGS. 5 and 8, except in the example illustrated in FIGS. 13 and 14, the agricultural work vehicle 420 includes two communication devices 124'", 127'", 129'" positioned on the traction unit 28'" and a third communication device 425a, 425b, 425n positioned on each of the headers 24a'", 24b'", 24n'". In the example illustrated in FIGS. 13 and 14, both the emitter 127'" and the receiver 129'" are positioned on the traction unit 28'" and the third communication device 425a, 425b, 425n is positioned on each of the headers 24a'", 24b'", 24n'". In this example, the emitter 127'" and the receiver 129'" are configured to communicate with each other in a wireless manner and are in electrical communication with the controller 47'". The third communication devices 425a, 425b, 425n are configured to communicate with the emitter 127'" and the receiver 129'" and may be a wide variety of types of communication devices.

In one example, the third communication devices 425a, 425b, 425n are unique reflectors. In such an example, the emitter 127'" emits a spectra of light, the reflectors 425a, 425b, 425n are each unique and would reflect a certain and different wavelength of light while absorbing the other light wavelengths, and the receiver 129'" would receive the unique wavelength of light and convey information to the controller 47'" associated with the received wavelength of light. Each of the headers 24a'", 24b'", 24n'" would include a different reflector 425a, 425b, 425n, respectively, that reflects a unique and different wavelength of light back to the receiver 129'". In this manner, the controller 47'" would be able to identify which header 24a'", 24b'", 24n'" is going to be connected to the header positioning assembly 32'" and the header positioning assembly 32'" would be adjusted to accommodate the one of the headers 24a'", 24b'", 24n that will be connected thereto.

In another example, the communication devices 425 may be RFID tags and each of the headers 24a'", 24b'", 24n'" would include a unique RFID tag 425a, 425b, 425n. The communication devices 124'", 127'", 129'" would communication with the RFID tags 425a, 425b, 425n to identify which header 24a'", 24b'", 24n'" is going to be connected to the header positioning assembly 32'" and the header positioning assembly 32'" would be adjusted to accommodate the one of the headers 24a'", 24b'", 24n'" that will be connected thereto.

In other examples, the communication devices 124'", 127'", 129'", 425 may produce, emit, and/or receive signals and the signals may be modified to correspond with the type of header 24a'", 24b'", 24n'" such that each header has a unique signal associated with it. For example, to provide the uniqueness, the signals may have a different wave type, different magnitude, different amplitude, different phases, different frequencies, among other types of signal differences.

It should be understood that the control system 123 and associated illustrations, diagrams, flowcharts, methods, steps, and operations described above may also apply to the embodiment illustrated in FIGS. 13 and 14 as appropriate, and such control system, illustrations, diagrams, flowcharts, methods, steps, and operations may be altered to accommodate any differences between the embodiment illustrated in FIGS. 13 and 14, and the other embodiments illustrated and described above.

With reference to FIGS. 15A and 15B, another example of a portion of an agricultural work vehicle is illustrated. The portion of the agricultural work vehicle illustrated in FIGS. 15A and 15B may have some structural and operational similarities to the agricultural work vehicles illustrated in FIGS. 3-14. Thus, like structure between the examples will be identified with like reference numbers and a quadruple prime symbol in the example of FIGS. 15A and 15B.

In FIGS. 15A and 15B, another example of a header positioning assembly 32'''' is illustrated and has some similarities to the header positioning assembly 32 illustrated in FIGS. 6A and 6B. Similarly to FIGS. 6A and 6B, FIGS. 15A and 15B are side elevational views of the header positioning assembly 32'''' and, as a result, only show one side of the header positioning assembly 32''''. It should be understood, similarly to prior embodiments and examples, that the header positioning assembly 32'''' includes two lift mechanisms 56'''', two lift/float actuators 72'''', and two adjustment actuators 80'''', with one of each of these mechanisms on each side of the header positioning assembly 32''''. Furthermore, since the mechanisms on both sides of the header positioning assembly 32'''' are similar in structure and function, only one side of the header positioning assembly 32'''' will be described herein with it being understood that the following description, and associated figures, apply to the mechanisms on both sides of the header positioning assembly 32''''.

In the example illustrated in FIGS. 15A and 15B, the adjustment actuator 80'''' is connected at a first end 108'''' to the chassis 58'''' of the traction unit 28'''' and to the lift mechanism 56'''' at the second end 112''''. In this example, the second end 64'''' of the lift mechanism 56'''' is moveably coupled to the chassis 52'''' of the traction unit 28'''. The lift mechanism 56'''' may be moveably coupled to the chassis 52'''' in a variety of manners and may be moveable relative to the chassis 52'''' in a variety of manners including, but not limited to, sliding, rotating, translating, or any other type of movement in a three-dimensional coordinate system. In the illustrated example, the chassis 52'''' defines an opening or slot 435 and the second end 64'''' of the lift mechanism 56'''' is positioned in and moveable along the slot 435. The adjustment actuator 80'''' is coupled to the second end 64'''' of the lift mechanism 56'''' and is actuatable to move the lift mechanism 56'''' relative to the chassis 52''''. The lift mechanism 56'''' still rotates relative to the chassis 52'''' about pivot axis 68''''. In this example, the pivot axis 68'''' of the lift mechanism 56'''' is moveable relative to the chassis 52'''' by actuating the adjustment actuator 80''''. By moving the pivot axis 68'''', the header positioning assembly 32'''' has different mechanical advantages to accommodate different types of headers 24a'''', 24b'''', 24n''''. In other examples, an adjustment mechanism may be connected to the lift mechanism 56'''' and the chassis 52'''', and the adjustment actuator 80'''' may be coupled to the adjustment mechanism. In such an example, the adjustment actuator 80'''' may be actuated to move the adjustment mechanism in a similar manner as that described above and such movement of the adjustment mechanism would move the lifting mechanism 56'''' and the pivot axis 68'''' relative to the chassis 52''''.

In FIG. 15A, the header positioning assembly 32'''' is illustrated in a first orientation or configuration associated with a first type of header 24b''''. In the illustrated example, this first orientation or configuration may be associated with the wide draper platform 24b'''' shown in FIG. 4. In this first orientation or configuration, a first angle A1'''' is formed between the lift actuator 72'''' (or direction of force F1) and the lift mechanism 56'''' and a first perpendicular distance or lever arm L1'''' is established between the pivot axis 68'''' and the lift actuator 72'''' (or direction of force F1). In this first orientation, the header positioning assembly 32'''' provides a first mechanical advantage established by the first distance or first lever arm L1'''' corresponding to a perpendicular distance from pivot axis 68'''' to the force F1 applied by the lift actuator 72''''. As indicated above, the pivot axis 68'''' of the lift mechanism 56'''' may be moved relative to the chassis 52''''. In the illustrated example, this movement of the pivot axis 68'''' occurs by actuating the adjustment actuator 80'''', which acts on the second end 64'''' of the lift mechanism 56'''' causing the second end 64'''' of the lift mechanism 56'''' to slide relative to the chassis 52'''' of the traction unit 28''''. In this configuration, the pivot axis 68'''' may be moved between numerous positions or orientations. Accordingly, the header positioning assembly 32'''' may be moved to a plurality of different orientations by actuating the adjustment actuator 80''''. These plurality of orientations may be associated with different types of headers 24''''.

Referring now to FIG. 15B, the header positioning assembly 32'''' is illustrated in a second orientation or configuration associated with a second type of header 24a''''. In the illustrated example, this second orientation or configuration may be associated with the rotary mower conditioner 24a'''' shown in FIG. 3. In this second orientation or configuration, the adjustment actuator 80'''' has been retracted (i.e., the length of the adjustment actuator decreased), thereby moving or sliding the pivot axis 68'''' upward relative to the chassis 52''''. In this second orientation, a second angle A2'''' is formed between the lift actuator 72'''' (or direction of force F2) and the lift mechanism 56'''' and a perpendicular second distance L2'''' is established between the pivot axis 68'''' and the lift actuator 72'''' (or direction of force F2). In this second orientation, the header positioning assembly 32'''' provides a second mechanical advantage established by the second distance or second lever arm L2'''' corresponding to a perpendicular distance from pivot axis 68'''' to the force F2 applied by the lift actuator 72''''. In this example, the second angle A2'''' is less than the first angle A1'''' and the second distance or second lever arm L2'''' is less than the first distance or first lever arm L1''''. By decreasing the angle between the lift actuator 72'''' (or direction of force) and the lift mechanism 56'''' and decreasing the distance or lever arm between the lift actuator 72'''' (or direction of force) and the pivot axis 68'''', a mechanical advantage of the header positioning assembly 32'''' has been decreased from the first orientation or configuration shown in FIG. 15A to the second orientation or configuration shown in FIG. 15B. FIGS. 15A and 15B show only two of many possible orientations of the header positioning assembly 32''''. The many orientations of the header positioning assembly 32'''' allow the header positioning assembly 32'''' to have a variety of different mechanical advantages. The ability of the header positioning assembly 32'''' to selectively and easily increase or decrease its mechanical advantage allows the header positioning assembly 32'''' to support a wide variety of header types and facilitate easy interchangeability of headers 24'''' on the traction unit 28'''' without significant or any physical exertion by the operator.

It should be understood that the control system 123 and associated illustrations, diagrams, flowcharts, methods, steps, and operations described above may also apply to the embodiment illustrated in FIGS. 15A and 15B as appropriate, and such control system, illustrations, diagrams, flowcharts, methods, steps, and operations may be altered to accommodate any differences between the embodiment illustrated in FIGS. 15A and 15B, and the other embodiments illustrated and described above.

Also, the following examples are provided, which are numbered for convenient reference, as follows:

1. A control system for an agricultural work vehicle, the control system comprising: at least one controller; at least one control input device configured to send control signals to the at least one controller; and a header positioning assembly configured to interchangeably couple a plurality of headers to a chassis of a traction unit, wherein the header positioning assembly is moveable between a plurality of orientations with each of the plurality of orientations providing a unique mechanical advantage; wherein the at least one controller is configured to output a plurality of control commands corresponding to the control signals generated by the at least one control input device; and wherein the control commands are configured to effect movement of the header positioning assembly between the plurality of orientations.

2. The control system of example 1, wherein the at least one control input device is at least one operator control input device configured to be actuated by an operator to generate the control signals.

3. The control system of example 2, wherein actuation of the at least one operator control input device is dependent upon the one of the plurality of headers to be coupled to the chassis of the traction unit.

4. The control system of example 1, wherein the at least one control input device includes at least one emitter and at least one receiver, wherein the at least one emitter is configured to generate and send the control signals and the at least one receiver is configured to receive the control signals from the at least one emitter and send the control signals to the at least one controller.

5. The control system of example 4, wherein the emitter is positioned on one of the plurality of headers and the receiver is positioned on the traction unit.

6. The control system of example 1, wherein the at least one control input device includes a plurality of emitters and at least one receiver, wherein the plurality of emitters are configured to generate and send the control signals and the at least one receiver is configured to receive the control signals from the plurality of emitters and send the control signals to the at least one controller.

7. The control system of example 6, wherein one of the plurality of emitters is positioned on each of the plurality of headers, and wherein the at least one receiver is positioned on the traction unit.

8. The control system of example 7, wherein each of the plurality of emitters generates a unique control signal associated with the one of the plurality of headers on which it is positioned.

9. The control system of example 1, wherein the header positioning assembly includes: a lift mechanism configured to interchangeably couple the plurality of headers to the chassis; at least one lift actuator configured to apply a force to the lift mechanism to adjust and maintain an orientation of the lift mechanism relative to the chassis; an adjustment mechanism coupled to the at least one lift actuator or to the lift mechanism, the adjustment mechanism positionable in at least two orientations and configured so that when the adjustment mechanism is in the at least two orientations, the adjustment mechanism changes one or more of a location and a direction of the force applied to the lift mechanism by the at least one lift actuator; and at least one adjustment actuator coupled to the adjustment mechanism and configured to move the adjustment mechanism into the at least two orientations; wherein the controller sends the plurality of control commands to the at least one adjustment actuator to move the adjustment mechanism between the at least two orientations.

10. The control system of example 9, wherein the at least one control input device is at least one operator control input device configured to be actuated by an operator to generate the control signals.

11. The control system of example 12, wherein actuation of the at least one operator control input device is dependent upon the one of the plurality of headers to be coupled to the chassis of the traction unit.

12. The control system of example 9, wherein the at least one control input device includes at least one emitter positioned on one of the plurality of headers and at least one receiver positioned on the traction unit, wherein the at least one emitter is configured to generate and send the control signals and the at least one receiver is configured to receive the control signals from the at least one emitter and send the control signals to the at least one controller.

13. The control system of example 9, wherein the at least one control input device includes a plurality of emitters and at least one receiver, wherein the plurality of emitters are configured to generate and send the control signals and the at least one receiver is configured to receive the control signals from the plurality of emitters and send the control signals to the at least one controller, wherein one of the plurality of emitters is positioned on each of the plurality of headers, and wherein the at least one receiver is positioned on the traction unit, and wherein each of the plurality of emitters generates a unique control signal associated with the one of the plurality of headers on which it is positioned.

14. An agricultural work vehicle comprising: a plurality of headers; a traction unit having a chassis; a header positioning assembly configured to interchangeably couple the plurality of headers to the chassis, wherein the header positioning assembly is moveable between a plurality of orientations with each of the plurality of orientations providing a unique mechanical advantage; and a control system including at least one controller, and at least one control input device configured to send control signals to the at least one controller, wherein the at least one controller is configured to output a plurality of control commands corresponding to the control signals generated by the at least one control input device, and wherein the control commands are configured to effect movement of the header positioning assembly between the plurality of orientations.

15. The agricultural work vehicle of example 14, wherein the at least one control input device is at least one operator control input device configured to be actuated by an operator to generate the control signals, and wherein actuation of the at least one operator control input device is dependent upon the one of the plurality of headers to be coupled to the chassis of the traction unit; or wherein the at least one control input device includes at least one emitter and at least one receiver, wherein the at least one emitter is configured to generate and send the control signals and the at least one receiver is configured to receive the control signals from the at least one emitter and send the control signals to the at least one controller.

As will be appreciated by one skilled in the art, certain aspects of the disclosed subject matter can be embodied as a method, system (e.g., an agricultural work vehicle control system included in an agricultural work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor or controller of a general purpose computer, special purpose computer, or other programmable data processing apparatus to produce a machine, such that the instructions, which execute via the processor or controller of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments and examples herein were chosen and described to best explain the principles of the disclosure and their practical application, and to enable others of ordinary skill in the art to understand the disclosure and recognize many alternatives, modifications, and variations on the described embodiments and examples. Accordingly, various embodiments and implementations other than those explicitly described are within the scope of the following claims.

What is claimed is:

1. A control system for an agricultural work vehicle, the control system comprising:
   at least one controller;
   at least one control input device configured to send control signals to the at least one controller; and
   a header positioning assembly configured to interchangeably couple a plurality of headers to a chassis of a traction unit, wherein the header positioning assembly is moveable between a plurality of orientations with each of the plurality of orientations providing a unique mechanical advantage, wherein the header positioning assembly includes:

a lift mechanism configured to interchangeably couple the plurality of headers to the chassis;
at least one lift actuator configured to apply a force to the lift mechanism to position the lift mechanism relative to the chassis;
an adjustment mechanism coupled to the at least one lift actuator or to the lift mechanism, the adjustment mechanism positionable in at least two orientations and configured so that when the adjustment mechanism is in the at least two orientations, the adjustment mechanism changes one or more of a location and a direction of the force applied to the lift mechanism by the at least one lift actuator; and
at least one adjustment actuator coupled to the adjustment mechanism and configured to move the adjustment mechanism into the at least two orientations;
wherein the at least one controller is configured to output a plurality of control commands corresponding to the control signals generated by the at least one control input device;
wherein the control commands are configured to effect movement of the header positioning assembly between the plurality of orientations; and
wherein the controller sends the plurality of control commands to the at least one adjustment actuator to move the adjustment mechanism between the at least two orientations.

2. The control system of claim 1, wherein the at least one control input device is at least one operator control input device configured to be actuated by an operator to generate the control signals.

3. The control system of claim 2, wherein actuation of the at least one operator control input device is dependent upon the one of the plurality of headers to be coupled to the chassis of the traction unit.

4. The control system of claim 1, wherein the at least one control input device includes at least one emitter and at least one receiver, wherein the at least one emitter is configured to generate and send the control signals and the at least one receiver is configured to receive the control signals from the at least one emitter and send the control signals to the at least one controller.

5. The control system of claim 4, wherein the emitter and the receiver are positioned on the traction unit.

6. The control system of claim 4, wherein the emitter is positioned on one of the plurality of headers and the receiver is positioned on the traction unit.

7. The control system of claim 1, wherein the at least one control input device includes a plurality of emitters and at least one receiver, wherein the plurality of emitters are configured to generate and send the control signals and the at least one receiver is configured to receive the control signals from the plurality of emitters and send the control signals to the at least one controller.

8. The control system of claim 7, wherein one of the plurality of emitters is positioned on each of the plurality of headers, and wherein the at least one receiver is positioned on the traction unit.

9. The control system of claim 8, wherein each of the plurality of emitters generates a unique control signal associated with the one of the plurality of headers on which it is positioned.

10. An agricultural work vehicle comprising:
a plurality of headers;
a traction unit having a chassis;
a header positioning assembly configured to interchangeably couple the plurality of headers to the chassis, wherein the header positioning assembly is moveable between a plurality of orientations with each of the plurality of orientations providing a unique mechanical advantage, wherein the header positioning assembly includes:
a lift mechanism configured to interchangeably couple the plurality of headers to the chassis;
at least one lift actuator configured to apply a force to the lift mechanism to position the lift mechanism relative to the chassis;
an adjustment mechanism coupled to the at least one lift actuator or to the lift mechanism, the adjustment mechanism positionable in at least two orientations and configured so that when the adjustment mechanism is in the at least two orientations, the adjustment mechanism changes one or more of a location and a direction of the force applied to the lift mechanism by the at least one lift actuator; and
at least one adjustment actuator coupled to the adjustment mechanism and configured to move the adjustment mechanism into the at least two orientations; and
a control system including:
at least one controller, and
at least one control input device configured to send control signals to the at least one controller,
wherein the at least one controller is configured to output a plurality of control commands corresponding to the control signals generated by the at least one control input device,
wherein the control commands are configured to effect movement of the header positioning assembly between the plurality of orientations, and
wherein the controller sends the plurality of control commands to the at least one adjustment actuator to move the adjustment mechanism between the at least two orientations.

11. The agricultural work vehicle of claim 10, wherein the at least one control input device is at least one operator control input device configured to be actuated by an operator to generate the control signals, and wherein actuation of the at least one operator control input device is dependent upon the one of the plurality of headers to be coupled to the chassis of the traction unit.

12. The agricultural work vehicle of claim 10, wherein the at least one control input device includes at least one emitter and at least one receiver, wherein the at least one emitter is configured to generate and send the control signals and the at least one receiver is configured to receive the control signals from the at least one emitter and send the control signals to the at least one controller.

13. The agricultural work vehicle of claim 12, wherein the emitter is positioned on one of the plurality of headers and the receiver is positioned on the traction unit.

14. The agricultural work vehicle of claim 10, wherein the at least one control input device includes a plurality of emitters and at least one receiver, wherein the plurality of emitters are configured to generate and send the control signals and the at least one receiver is configured to receive the control signals from the plurality of emitters and send the control signals to the at least one controller.

15. The agricultural work vehicle of claim 14, wherein one of the plurality of emitters is positioned on each of the plurality of headers, and wherein the at least one receiver is positioned on the traction unit, and wherein each of the plurality of emitters generates a unique control signal associated with the one of the plurality of headers on which it is positioned.

\* \* \* \* \*